US 7,034,835 B2

(12) United States Patent
Whatmough

(10) Patent No.: US 7,034,835 B2
(45) Date of Patent: Apr. 25, 2006

(54) SYSTEM AND METHOD OF CONVERTING FRAME-BASED ANIMATIONS INTO INTERPOLATOR-BASED ANIMATIONS

(75) Inventor: Kenneth J. Whatmough, Georgetown (CA)

(73) Assignee: Research in Motion Ltd., Waterloo (CA)

( * ) Notice: Subject to any disclaimer, the term of this patent is extended or adjusted under 35 U.S.C. 154(b) by 309 days.

(21) Appl. No.: 10/721,313

(22) Filed: Nov. 25, 2003

(65) Prior Publication Data

US 2004/0160445 A1 Aug. 19, 2004

Related U.S. Application Data

(60) Provisional application No. 60/429,570, filed on Nov. 29, 2002, provisional application No. 60/447,022, filed on Feb. 13, 2003.

(51) Int. Cl.
*G06T 13/00* (2006.01)
(52) U.S. Cl. .................. 345/473; 345/474; 345/475
(58) Field of Classification Search ................ 345/473
See application file for complete search history.

(56) References Cited

U.S. PATENT DOCUMENTS

| | | | | |
|---|---|---|---|---|
| 5,546,518 | A * | 8/1996 | Blossom et al. | 345/473 |
| 5,619,628 | A * | 4/1997 | Fujita et al. | 345/427 |
| 5,706,417 | A * | 1/1998 | Adelson | 345/640 |
| 5,727,141 | A * | 3/1998 | Hoddie et al. | 345/475 |
| 6,081,278 | A * | 6/2000 | Chen | 345/473 |
| 6,538,654 | B1 * | 3/2003 | Rose et al. | 345/473 |

OTHER PUBLICATIONS

International Search Report for corresponding PCT/CA03/01851, Apr. 2, 2004.
Written Opinion, PCT/CA03/01851, Nov. 28, 2003.
Richardson Iain E.G.: "Video Codec Design; 4. Video Coding Standards: JPEG and MPEG, pp. 47-77", John Wiley & Sof Published Online: Jun. 25, 2002 XP002275983 p. 67-74.
Ngai C H El Al:"XVIP: an XML —based video information processing system" Proceedings 26th Annual International Computer Software and Applications, Proceedings of 26th Annual International Computer Software and Applications, Oxford, UK, Aug. 26-29, 2002, pp. 173-178, XP010611113 2002, Los Alamitos, CA, USA, IEEE Comput. Soc, USA ISBN: 0-7695-1727-7 abstract p. 2-3.

(Continued)

*Primary Examiner*—Richard Hjerpe
*Assistant Examiner*—Andrew Yang
(74) *Attorney, Agent, or Firm*—Ridout & Maybee LLP

(57) ABSTRACT

A system and method of converting frame-based animation into interpolator-based animation is provided. The system and method includes a) identifying each unique combination of animation object and associated depth identified in frame instructions for the plurality of frames of the frame-based animation; b) for each identified unique combination, identifying the display properties associated with the animation object of the combination through the successive frames; and c) for each identified display property for each identified unique combination, creating an interpolator that specifies the animation object of the combination and any changes that occur in the display property for the specified animation object throughout the plurality of frames.

20 Claims, 13 Drawing Sheets

OTHER PUBLICATIONS

Yesun Joung et al: "XM tools for interactive broadcasting contents description" Proceedings Third International Workshop on Digital and Computational Video. DCV 2002 (Cat. No. 02EX724), Proceedings Third International Workshop on Digital and Computational Video. DCV 2002, Clearwater Beach, FL, USA, Nov. 14-15, 2002, pp. 184-191, XP010649295 2002, Piscataway, NJ, USA, IEEE, USA ISBN: 0-7803-7984-5 the whole document.

Ogura T et al: "Video portal for a media space of structured•video streams" Proceedings 2002 IEEE International Conference on Multimedia and Expo (Cat. No. 02TH8604), Proceedings of IEEE International Conference on Multimedia and Expo (ICME),Lausanne, Switzerland, Aug. 26-29, 2002, pp. 309-312 vol. 2, XP010604759 2002, Piscataway, NJ, USA, IEEE, USA ISBN: 0-7803-7304-9 the whole document.

Christel M G et al: "SVG for navigating digital news video" Proceedings of the 9th. ACM International Conference on Multimedia. Ottawa, Canada, Sep. 30-Oct. 5, 2001, ACM International Multimedia Conference, New York, NY: ACM, US vol. Conf. 9, Sep. 30, 2001, pp. 483-485, XP002250552 ISBN: 1-58113-394-4 the whole document.

Quint A: "Scalable vector graphics"IEEE Multimedia, Jul.-Sep. 2003, IEEE, USA, vol. 10, No. 3, pp. 99-102, XP002275982 ISSN: 1070-986X p. 100-101 sections "Animation" and Scripting.

\* cited by examiner

```
<svg
    width="120.0"
    height="130.0">

<!-- Background rectangle -->
<rect
    x="0.0"
    y="0.0"
    width="120.0"
    height="130.0"
    fill="rgb(255,255,255)"/>

<path
    fill="rgb(0,0,255)"
    stroke="rgb(0,0,0)"
    stroke-width="1.0"
    stroke-linecap="round"
    stroke-linejoin="round"
    d="M20.0 0.0L0.0 30.0L40.0 30.0L20.0 0.0">
    <animateTransform
        begin="0.5"
        attributeName="transform"
        dur="1s"
        type="translate"
        keyTimes="0; 0.1; 0.2; 0.3; 0.4; 0.5; 0.6; 0.7; 0.8; 0.9; 1.0"
        values="0.0 0.0; 5.0 1.0; 10.0 2.0; 15.0 3.0; 20.0 4.0; 25.0 5.0; 30.0 6.0; 35.0 7.0; 40.0 8.0; 45.0 9.0; 50.0 10.0"
        fill="freeze"/>
</path>
</svg>
```

106: path element block
120: animateTransform element block
1104

FIG. 13 (continued)

SYSTEM AND METHOD OF CONVERTING FRAME-BASED ANIMATIONS INTO INTERPOLATOR-BASED ANIMATIONS

This application claims priority to U.S. Provisional Patent Applications Ser. No. 60/429,570 filed Nov. 29, 2002 and Ser. No. 60/447,022 filed Feb. 13, 2003, the entire disclosures of which are incorporated herein by reference.

BACKGROUND

1. Field of the Invention

This invention relates generally to computer animations and specifically to formats for representing computer animations.

2. Description of the State of the Art

Two types of formats are predominantly used to represent computer animations: frame-based animation formats and interpolator-based animation formats. These types of animation formats differ fundamentally in how they represent computer animations, thus computer software that displays frame-based animations is typically unable to display interpolator-based animations.

In frame-based animation formats, an animation is comprised of a group of animation objects and a series of frames. Each frame comprises animation objects which are displayed at a particular time in the animation, and properties which specify how the objects are displayed. Computer software that displays a frame-based animation displays the frames in the animation sequentially. When animation objects are included in successive frames with different properties, the objects appear to be moving or otherwise changing when the computer software displays the frames of the animation.

In interpolator-based animation formats, an animation is comprised of a group of animation objects and a group of interpolators. Each interpolator specifies how a property of an animation object changes over time. For example, an interpolator may specify that a rectangle appears at the bottom-left corner of a computer display, travels to the top-right corner of the computer display, and takes five seconds to do so. Computer software that displays an interpolator-based animation displays the animation objects and manipulates the properties of the animation objects over time as specified by the interpolators, thus creating the appearance that the animation objects are moving or otherwise changing.

An interpolator-based animation often consumes less storage space than a frame-based animation which appears the same when displayed, since a single interpolator can specify a movement that would require many frames to specify. Minimizing storage space is especially beneficial when animations are displayed on mobile communication devices, since they often have limited amounts of computer memory and processing capacity. Mobile communication devices also typically have limited bandwidth with which to communicate via wireless networks.

When displaying interpolator-based animation, the rendering device is generally at liberty to vary the rate at which the display is updated. In frame based animation, the frame rate is typically set at a constant rate. The rate flexibility available in interpolator-based animation allows a rendering device to reduce the display rate, which can be useful in the resource and power limited environment of a mobile device.

Thus, an efficient system and method for converting frame-based animations to interpolator-based animations is desired.

SUMMARY

A method for converting a frame-based animation into an interpolator-based animation, the frame based animation including a plurality of animation objects and a plurality of successive frames represented by frame instructions, the frames including a displayed group of the animation objects. The animation objects in the displayed group have associated display properties that change throughout the successive frames, and the animation objects in the displayed group each appear at a unique associated depth in the frames. The frame instructions identify for each frame the animation objects from the displayed group appearing therein and the display properties and depth associated with each of the animation objects appearing therein. The method including steps of: a) identifying each unique combination of animation object and associated depth identified in the frame instructions for the plurality of frames; b) for each identified unique combination, identifying the display properties associated with the animation object of the combination through the successive frames; and c) for each identified display property for each identified unique combination, creating an interpolator associated with the animation object of the combination which specifies any changes that occur in the display property for the specified animation object throughout the plurality of frames.

A converter for converting a frame-based animation into an interpolator based animation, the frame-based animation including a plurality of animation objects each having an associated type identifier and a plurality of successive frames represented by frame instructions, the frames including a displayed group of the animation objects, the animation objects in the displayed group having associated display properties that change throughout the successive frames, the animation objects in the displayed group each appearing at a unique associated depth in the frames. The frame instructions specify for each frame the animation objects appearing therein, and display properties and associated depth of the animation objects appearing therein. The interpolator based animation includes the plurality of animation objects and a plurality of interpolators, each interpolator being associated with a target display property of a target animation object type selected from the plurality of animation objects and specifying changes that occur in the target display property during a display duration. The converter includes: an input module for receiving a frame based animation and extracting the frame instructions therefrom; a converter module for (a) receiving the extracted frame instructions from the input module and based thereon identifying each unique combination of animation object and associated depth appearing in the plurality of frames, and (b) for each identified unique combination, identifying the display properties associated with the animation object of the combination through the plurality of frames; and an output module responsive to the converter module for creating for each identified display property for each identified unique combination an interpolator specifying (i) the identified display property as a target display property, (ii) the animation object of the combination as a target animation object, and (iii) any changes that occur in the display property for the specified animation object throughout the plurality of frames.

DETAILED DESCRIPTION

Figure 1:
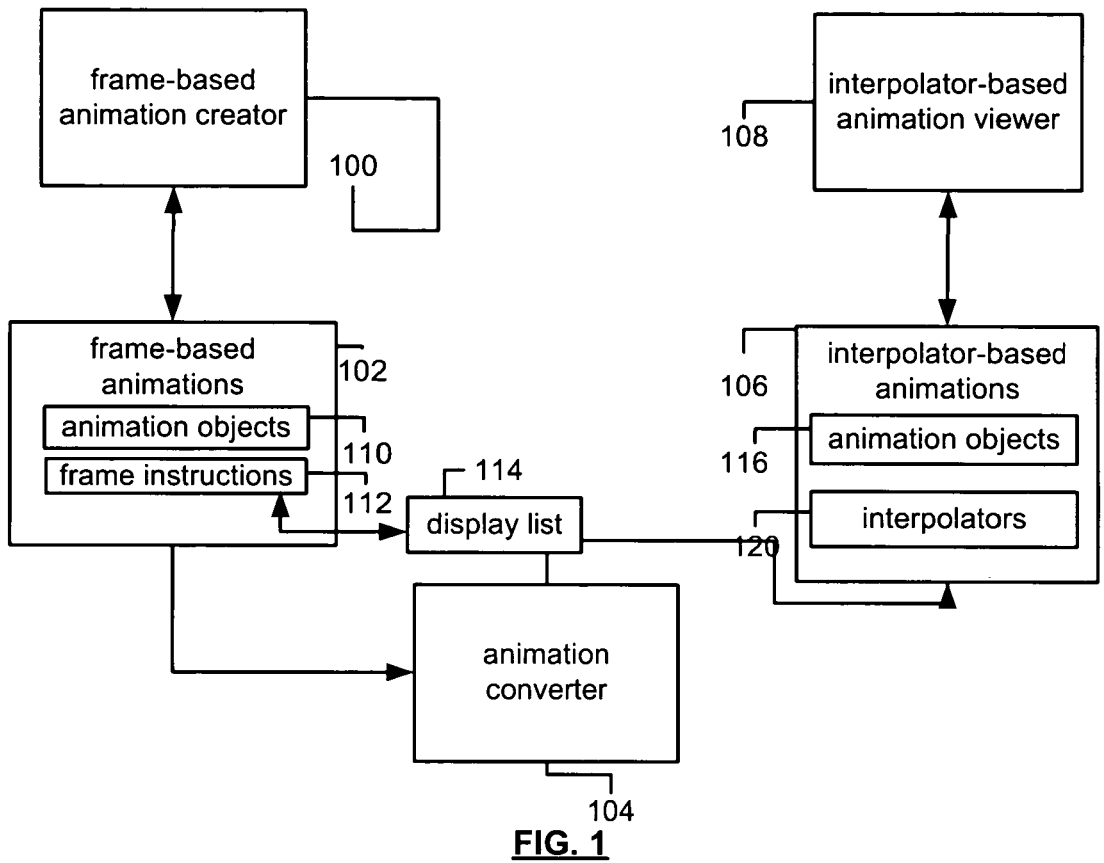
FIG. 1 is a block diagram of an animation system in accordance with an embodiment of the invention.

FIG. 1 is a block diagram of an animation system in accordance with an embodiment of the invention. The animation system includes a frame-based animation creator 100, frame-based animations 102, an animation converter 104, interpolator-based animations 106, and an interpolator-based animation viewer 108.

The frame-based animation creator 100 is used to create frame-based animations 102. The frame-based animation creator 100 is implemented as computer software which is executed by a computer.

Each of the frame-based animations 102 comprises a group of animation objects 110, including shapes, images, buttons and text, and a series of frame instructions 112 representing successive display frames. In an example embodiment, the frame-based animation 102 is an electronic file that includes the information necessary for a frame based rendering device to display the frames that are represented in the frame-based animation 102. Such information includes the animation objects, which each have an associated identifier, and the frame instructions. The frames each include a displayed group of the animation objects, and are created using a display list 114, which specifies which of the animation objects are displayed in the current frame and display properties of such animation objects. The display list is created and then modified for successive frames by the frame instructions, which include instructions to add or remove animation objects to the display list, and to change the display properties as required for the frame associated with the frame instructions. The display properties include the position, color, scale, rotation and skew of animation objects that are displayed in the frame. A frame is created by manipulating the display list, by adding, removing or changing animation objects, and then rendering the frame according to the contents of the display list.

Each of the animation objects is added to the display list at a particular depth that is specified in the frame instructions. The depths of the animation objects determine the order in which the animation objects are rendered. The display list contains at most one animation object at a particular depth. Different instances of the same animation object can appear at different depths in each frame.

Thus, the frame-based animations 102 are represented in computer memory as data that defines animation objects 110 and computer instructions 112 for creating frames that include selected animation objects. Each of the computer instructions for a frame specifies that an animation object should be added to the display list 112, that an animation object should be removed from the display list 112, that new display properties should be set for an animation object in the display list, or that a frame should be rendered according to the contents of the display list.

A frame-based animation is displayed by computer software by displaying each of the frames of the frame-based animation sequentially. Each frame is displayed for an identical period of time, which is determined by a configurable frame-rate. A frame-rate is expressed as a number of frames displayed per time-unit, and is typically frames-per-second. The animation objects in each frame are displayed in an order determined by the depth values associated with the animation objects. Animation objects which are assigned lower depth values are displayed underneath animation objects which are assigned higher depth values.

The animation objects in the frame-based animations 102 also include sprites, which are independent animations within a frame-based animation. Each sprite comprises animation objects and frames as described above. When a sprite is added to a display list and rendered in a frame of a frame-based animation, the frames in the sprite are displayed concurrently with the frames in the frame-based animation. Each sprite has a looping property, which specifies whether the frames in the sprite are displayed continuously during the frame-based animation, so that when the last frame in the sprite is displayed, the sprite continues to be displayed starting with the first frame.

The interpolator-based animation viewer 108 is used to view interpolator-based animations 106. The interpolator-based animation viewer 108 is implemented as computer software which is executed by a computer, or alternatively by a mobile computing device. The interpolator-based animations 106 are represented by data in computer memory.

Each of the interpolator-based animations 106 comprises animation objects 116, including shapes, images, buttons and text. The animation objects each have associated display properties including position, visibility, color, scale, rotation and skew.

Each of the interpolator-based animations 106 further comprises a group of interpolators 120, which specify values for the display properties for each of the animation objects 116 over time. Each interpolator specifies a duration, a target animation object, a target display property of the target animation object, a set of key-times, and a value of the target display property for each of the key-times. The key-times are normalized from zero to one.

The interpolator-based animation viewer 108 displays an interpolator-based animation by rendering the animation objects as specified by the interpolators. For each interpolator, the interpolator-based animation viewer 108 sets the target display property of the target animation object at the times specified by the key-times. The time that a target display property is set for a particular key-time is the product of the key-time and the duration specified by the interpolator.

For example, an interpolator may specify a duration of 10 seconds, a target animation object which is a square, a target display property which is the x-coordinate of the position of the square, key-times of 0, 0.5 and 0.6, and corresponding values of 0, 100 and 200. At the beginning of the animation, the interpolator-based animation viewer 108 sets the x-coordinate of the square's position to 0, then five seconds into the animation, the interpolator-based animation viewer 108 sets the x-coordinate of the square's position to 100, then six seconds into the animation the interpolator-based animation viewer 108 sets the x-coordinate of the square's position to 200.

In an alternative embodiment, the key times are not be normalized between zero and one, but instead are units of real time, in which case a duration value is not required.

The animation objects specified by the interpolators are displayed in the order in which the animation objects are processed by the interpolator-based animation viewer 108. Animation objects which are processed first are displayed underneath animation objects which are subsequently processed. The animation objects are processed in the order in which they are specified in each of the interpolator-based animations 106.

Figure 2:
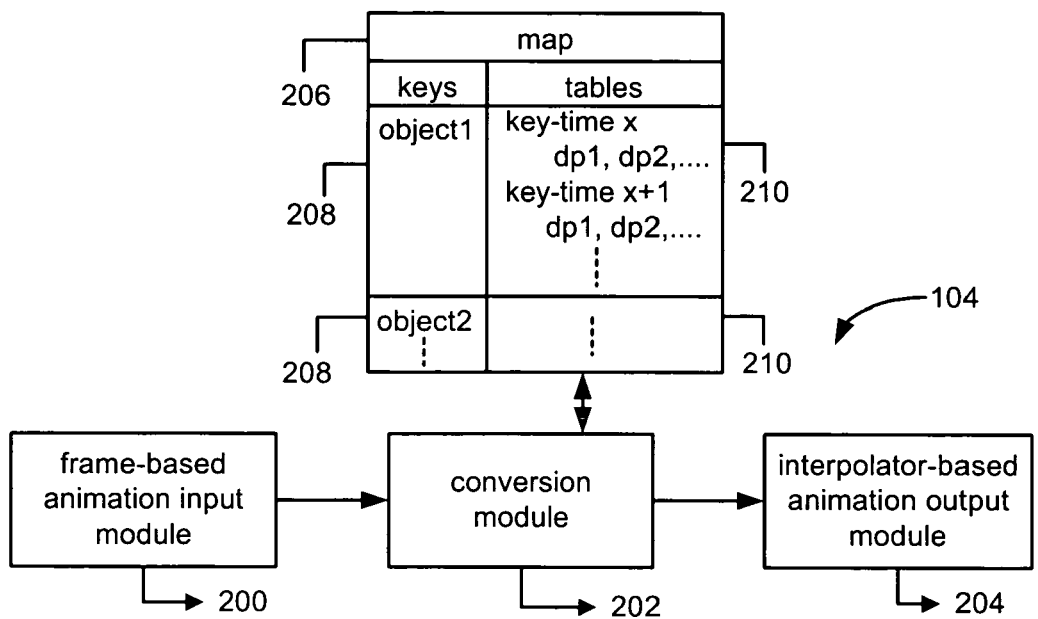
FIG. 2 is a block diagram of a system of converting frame-based animations into interpolator-based animations.

The animation converter 104 converts frame-based animations 102 created by the frame-based animation creator 100 into equivalent interpolator-based animations 106 which can be viewed with the interpolator-based animation viewer 108. When viewed, a frame-based animation and the equivalent interpolator-based animation which is produced by the animation converter 104 appear the same. The animation converter 104 implements a system of converting frame-based animations 102 into interpolator-based animations 106 as is shown in FIG. 2. The animation converter 104 is implemented as computer software which is executed by a computer.

FIG. 2 is a block diagram of animation converter 104, which implements a system of converting frame-based animations into interpolator-based animations. The animation converter system includes a frame-based animation input module 200, a conversion module 202 and an interpolator-based animation output module 204.

The frame-based animation input module 200 receives a frame-based animation 102 as input. The frame-based animation 102 is represented by binary data in a computer-readable file, and is comprised of animation objects 110 and frames instructions 112. The frame instructions 112 represent frames and are computer instructions to add animation objects to a display list 114, remove animation objects from the display list 114, change properties of animation objects in the display list 114, and render frames based on the contents of the display list 114, as described above. The frame-based animation input module 200 reads the computer instructions 112 and recreates the contents of the display list, thereby determining the content of each of the frames represented in the frame-based animation. For each instance of an animation object being displayed in a frame, the values of the display properties and depth of the animation object are also determined. The frame-rate of the frame-based animation is also determined.

The conversion module 202 uses the animation objects 110 received by the frame-based animation input module 200 and the frame information determined by the frame-based animation input module 200 to create a map 206 that will be used by the interpolator-based animation output module 204.

The display properties (dp1, dp2, . . . ) for each animation object in each of the frames is recorded in the map 206. For each animation object at each depth, a key 208 is created. The key 208 comprises a unique identifier for the animation object, and the depth at which the animation object is displayed in the frame. In one embodiment the unique identifier for the animation object is an object type identifier. The creation of a key that combines an object type identifier with an object depth allows multiple instances of an object in a frame based animation 102 to be uniquely identified. As noted previously, in frame based animations, more than one instance of the same animation object can appear in the same frame, but at different depths. Thus, the same object type identifier can appear multiple times, but at different display depths, in a frame. The keys 208 are thus created so that there is a unique key for each unique combination of animation object and depth.

The keys 208 are represented in computer memory by 32-bit integers. The most significant 16 bits specify the depth at which the animation object is displayed, while the least significant 16 bits specify the animation object's unique identifier, which allows the keys to be sorted by the depth values. A different number of bits may alternatively be used to represent the key.

The value mapped to each key 208 is a table 210, which comprises a set of key-times (key-time x, key-time x+1, etc.), a set of display properties (dp1, dp2, etc.), and for each of the key-times, a value for each of the display properties.

The conversion module 202 creates the map 206 by iterating through the frames in the animation. For each animation object in each frame, a key 208 is created, as described above. If the key 208 is not present in the map, then the key is added to the map 206, and an associated table 210 is created. If the key 208 is present in the map, then the associated table 210 to which the key maps is retrieved. If at least one of the display properties (dp) for the animation object has changed since the previous time the table 210 was updated, then an entry is added to the table which specifies a key-time, and a value for each of the display properties for the animation object in the frame. The key-time is calculated based on the position of the frame in the animation, and the frame-rate. Each frame in the animation is displayed for a period of time equal to the inverse of the frame-rate, so the key-time for a given frame is the position of the frame, multiplied by the inverse of the frame-rate. The key-times are normalized from zero to one, and the duration of the animation is recorded in the table. The duration is the number of frames divided by the frame-rate.

For example, if there are 100 frames in an animation, and the frame-rate is 20 frames per second, then the duration of the animation is 5 seconds. Each frame is displayed for 1/20 seconds. The key-times are determined to be 1/20 seconds for the first frame, 2/20 seconds for the key-time for the second frame, 3/20 seconds for the key time for the third frame, and so on. The key-times are then normalized so that each key-time is a value from zero to one.

Where an animation object at a particular depth is not present in every frame in the frame-based animation, the visibility display property is included in the table corresponding to the animation object in the map. If the animation object is not present in a frame, then the visibility display property specifies that the animation object is not visible.

When the conversion module 202 has iterated through all the frames, the map contains a unique key for each animation object at each depth, and a corresponding table which contains the values for each display property of the animation object for each time that one of the display values changes in the animation. The mapping ensures that only one table is created for an animation object at a particular depth in an animation, even where the animation object is not included in every frame.

Where an animation object is a sprite, for each animation object in each frame in the sprite, a key and a table are added to the map as described above. In tables for animation objects which are included in a sprite, the key-times correspond to the position of the frame in the sprite, and the duration recorded is the number of frames in the sprite, divided by the frame rate. The table to which the key corresponding to the sprite maps contains a visibility property, which specifies whether the sprite, including all the animation objects contained in the sprite, is visible at different times in the animation. The table also contains a display property which specifies whether the sprite loops, as described above.

The interpolator-based animation output module 204 uses the map 206 created by the conversion module 202 to create interpolators 120 for the interpolator-based animation 106 which is outputted by the system of converting frame-based animations into interpolator-based animations.

The map 206 is sorted in ascending order by the value of the keys. Since the most significant bits of the keys specify the depths of the animation objects, the sorted map is ordered according to the depths of the animation objects in the frames.

For each key in the map, an interpolator 120 is created by the interpolator-based animation output module 204 for each display property for which there are values in the table to which the key maps. For each interpolator created for a display property for which there are values in the table mapped to by one of the keys in the map, the target animation object is the animation object specified in the key. The target display property is the display property for which there are values in the table. The key-times specified by the interpolator are the key-times contained in the table. The values which correspond to the key times are the values for the display property which are specified in the table. The duration specified by the interpolator is the duration recorded in the table, as described above.

The interpolator-based animation output module 204 outputs an interpolator-based animation comprising the animation objects and the interpolators. The animation objects are specified by the interpolator-based animation in an order corresponding to the order of the keys in the map, so that animation objects of lesser depths are specified first, and animation objects of greater depths are specified last. The order ensures that when the outputted interpolator-based animation is displayed, the animation objects will be rendered in an order which is equivalent to the depths specified by the inputted frame-based animation.

The interpolator-based animation is outputted in extensible markup language (XML) format to a computer-readable file.

Figure 3:
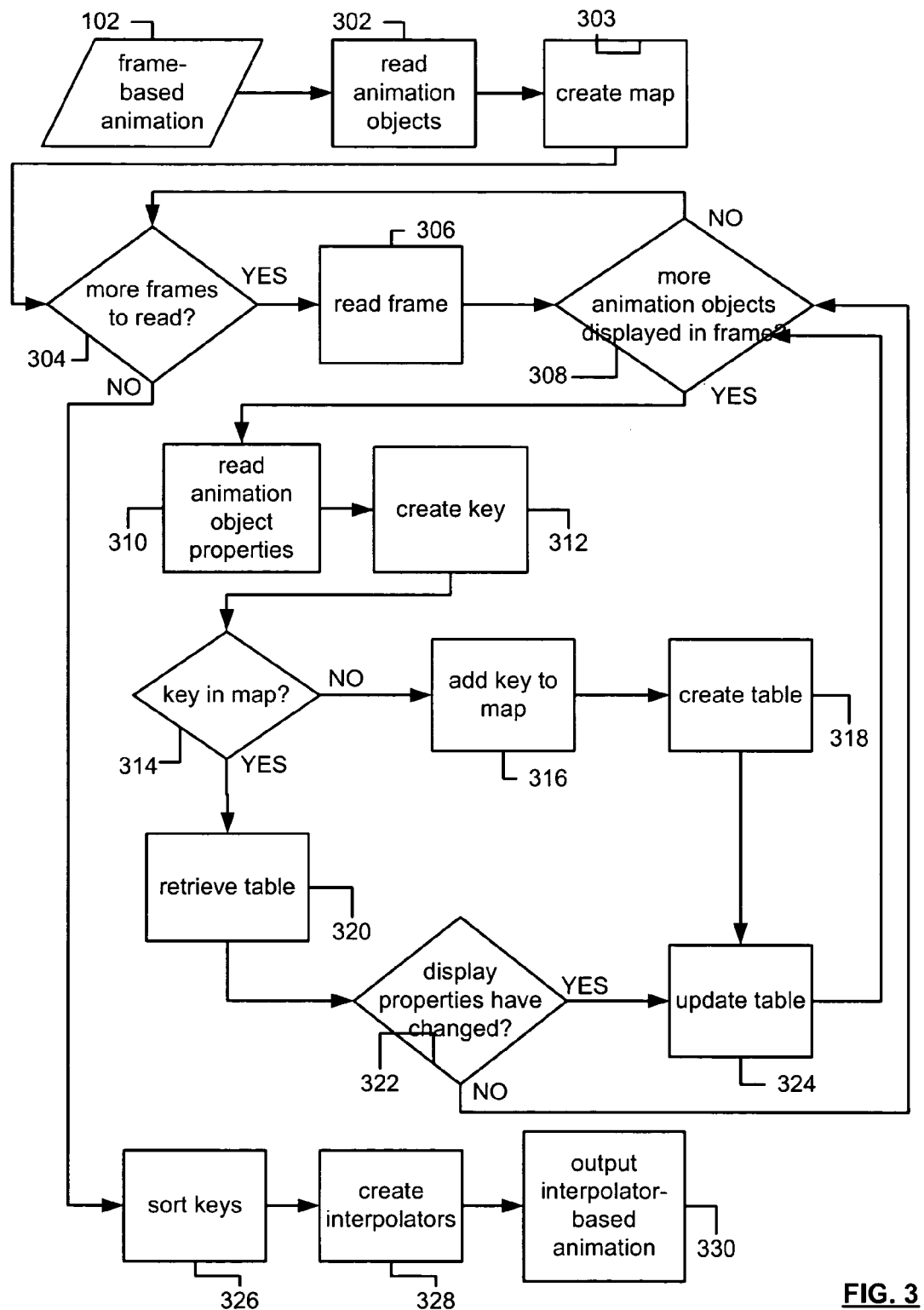
FIG. 3 is a flow-chart illustrating a method of converting a frame-based animation into an interpolator-based animation.

FIG. 3 is a flow-chart illustrating a method of converting a frame-based animation into an interpolator-based animation, which in an example embodiment is carried out by animation converter 104. The method receives an inputted frame-based animation 102 and creates and outputs an equivalent interpolator-based animation. The frame-based animation 102 contains animation objects and frames, as described above.

The method beings with step 302 of reading the animation objects 110 which are included in the frame-based animation 102. The method continues with step 303 of creating a map 206 to store information from the frame-based animation 102 which is used to create the equivalent interpolator-based animation.

The method continues with step 304 of determining whether there are frames in the frame-based animation 102 which have not yet been read. The frames are represented in the frame-based animation 102 by computer instructions 112 to add an animation object to a display list 114, remove a display object from the display list, change the properties of an animation object in the display list, and render a frame based on the contents of the display list. There are more frames to read if there are more computer instructions 112 in the frame-based animation 102 which specify that a frame should be rendered.

If it is determined at step 304 that there are no more frames to read, then the method continues at step 326. If there are more frames to read, then a frame is read at step 306. The frame is read by reading computer instructions 112 as described above.

The method continues by iterating through the animation objects which are in the displayed group of animation objects in the frame read at step 306. An animation object may appear at different depths in a single frame, in which case the animation object appears once in the iteration for each depth at which the animation object appears in the frame. No more than one animation object may appear at a single depth in a frame, thus an animation object cannot appear more than once with the same depth.

The animation objects which are displayed in the frame read at step 306 may include sprites, in which case each of the animation objects in the sprites are included in the iteration.

Step 308 determines whether all the animation objects displayed in the frame have been iterated. If there are more animation objects displayed, then the method continues at step 310. Otherwise, the method continues at step 304.

At step 310, the properties of an animation object in the frame read at step 306 are read. The properties include the depth of the object in the frame, and display properties including position, color, scale, rotation and skew.

The method continues with step 312 of creating a key 208 which specifies the animation object whose properties are read at step 310 and the depth of the animation object. Since the same animation object does not appear more than once with the same depth in a frame, the combination of animation object identifier and depth constitutes a unique key.

The method continues with step 314 of determining whether the key 208 created at step 312 is in the map 206 created at step 303. If it is determined that the key 208 is not in the map 206, then the key is added at step 316. The method then continues at step 318, where a table 210 associated with the key is created to store the display properties read at step 310, associated key-times, and a duration value. The map 206 is updated so that the key 208 created at step 312 maps to the newly created table 210.

The method then continues at step 324, where the table 210 created at step 318 is updated. A new key-time which corresponds to the position of the frame is added to the table. If the animation object for which properties are read at step 310 is not included in a sprite, then the key-time is equal to the position of the frame in the frame-based animation 102, multiplied by the inverse of the frame-rate. If the animation object is included in a sprite, then the key-time is equal to the position of the frame in the sprite, multiplied by the inverse of the frame-rate. The key-times in the table are normalized such that the key-times are values from zero to one.

The duration value is updated based on the frame-rate. If the animation object is not in a sprite, then the duration is the number of frames in the frame-based animation 102 divided by the frame-rate. If the animation object is in a sprite, then the duration is number of frames in the sprite divided by the frame-rate.

For each display property read at step 310, a value for the display property is entered into the table 210 so that it is associated with the key-time. The method then continues at step 308.

If it is determined at step 314 that the key created at step 312 does exist in the map 206 created at step 303, then the method continues at step 320, where the table 210 to which the key maps is retrieved. The method then continues at step 322, where it is determined whether the values of the display properties of the animation object for which properties were read at step 310 have changed since they were recorded in the table 210. If the display properties read at step 310 differ from the display properties recorded in the table 210, then the table is updated at step 324. Otherwise, the method continues at step 308.

The method continues at step 326, where it is determined at step 304 that there are no more frames to read. The map created at step 303 contains keys 208 for each combination of animation object and depth in the frame-based animation 102. The tables to which the keys map contain values for each of the display properties of the animation objects at key-times which correspond to the frames. At step 326, the keys created at step 312 are sorted in ascending order. This ensures that the keys which specify lesser depths appear first in the map.

The method continues with step 328 of creating interpolators based on the contents of the map 206 created at step 303. An interpolator is created for each display property in each table created at step 318. The target animation object specified by the interpolator is the animation object whose unique identifier is included in the key which maps to the table. The target display property specified by the interpolator is the display property included in the table. The key-times specified by the interpolator are the key-times in the table. The display property values associated with the key-times specified by the interpolator are the values of the display properties in the table which correspond to the key-times in the table. The duration specified by the interpolator is the duration recorded in the table.

The method concludes with step 330 of outputting an interpolator-based animation which is equivalent to the inputted frame-based animation 102. The interpolator-based animation comprises the animation objects read at step 302, and the interpolators created at step 328. The animation objects are outputted in an order corresponding to the order of the keys in the map, so that when the interpolator-based animation is displayed, the animation objects specified by the interpolators are displayed in an order which corresponds to the depths specified in the frame-based animation 102.

The method illustrated in FIG. 3 may contain additional, fewer, or differently ordered steps than those which are shown. For example, in some embodiments, the keys in the map could be sorted each time a new key was added at step 316, rather than at step 326 after all the keys have been added.

Figure 4:
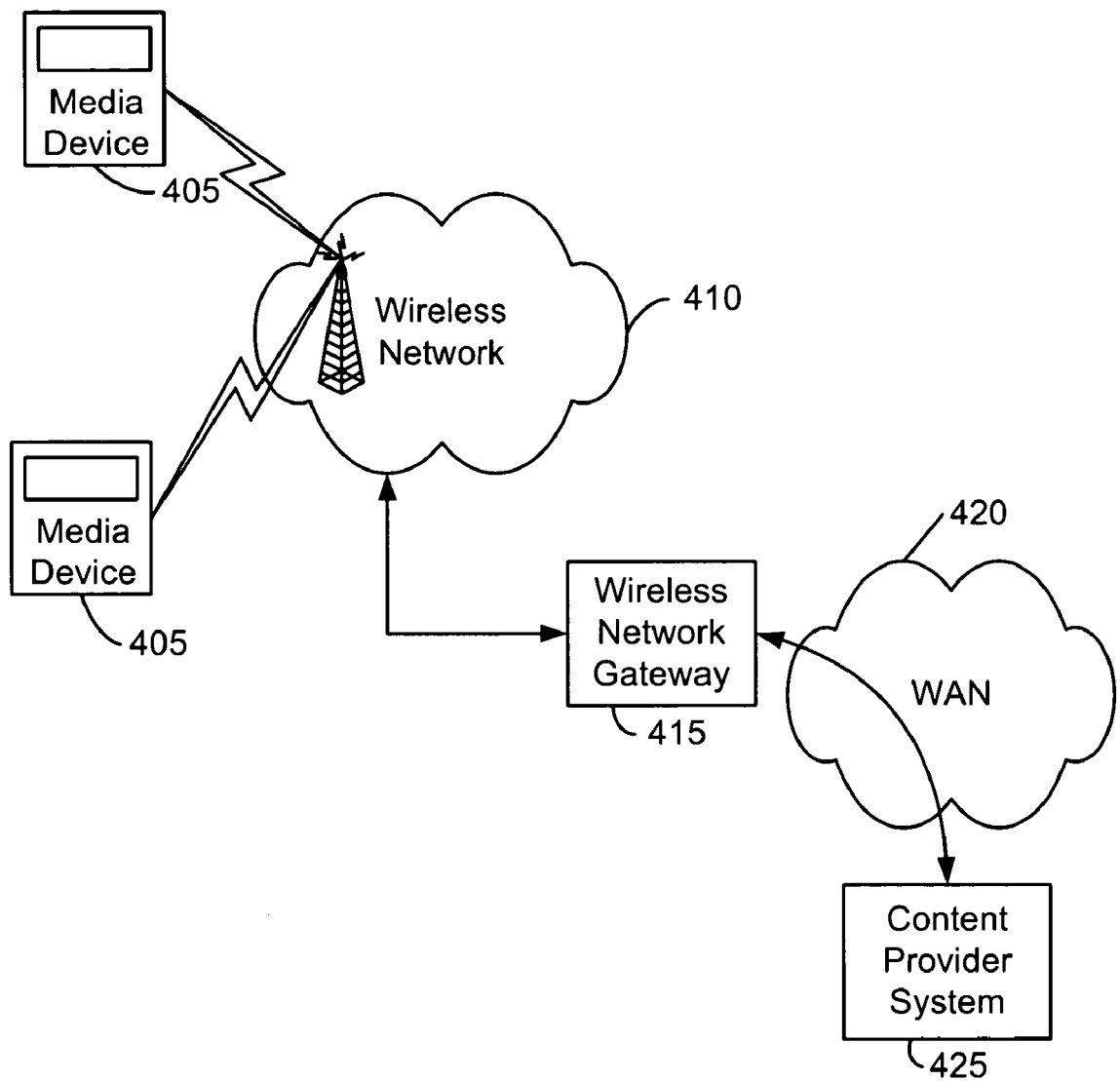
FIG. 4 is a block diagram of a communication system to which the animation conversion system may be applied in accordance with example embodiments of the present invention.

FIG. 4 is a block diagram of a communication system in which an animation conversion system of the present invention may be applied. The communication system comprises media devices 405 for presenting content, a wireless network 410 for communicating with the media devices 405, a wireless network gateway 415 for interfacing the wireless network 410 with a wide area network (WAN) 420 for connecting the wireless network gateway 415 to a content provider system 425.

The wireless network gateway 415 provides an interface between the wireless network 410 in which the media devices 405 operate, and the WAN 420 in which the content provider system 425 is configured to operate. The WAN 420 comprises the Internet, a direct connection, a local area network (LAN), a wireless communication link, and any combinations thereof.

The content provider system 425 provides the content for presentation on the media devices 405. The content is provided in a binary format for processing by the media devices 405. The binary format is substantially the content as it is to exist in memory on the media devices 405, with a header. The content includes rich content.

The media devices 405 include, for example, data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of fixed or mobile wireless communication devices. Each of the media devices 405 is configured to operate within the wireless network 410. A receiver and transmitter subsystem or transceiver (not shown) is included within each of the media devices 405 for operation the wireless network 415. It should be appreciated however that the invention is in no way limited to these example types of devices and may be implemented in other devices with displays.

Alternately, the content provider system 425 may also provide content to any system connected to the WAN 420, including both wireless gateways as well as non-mobile systems such as desktop computer systems.

Figure 5:
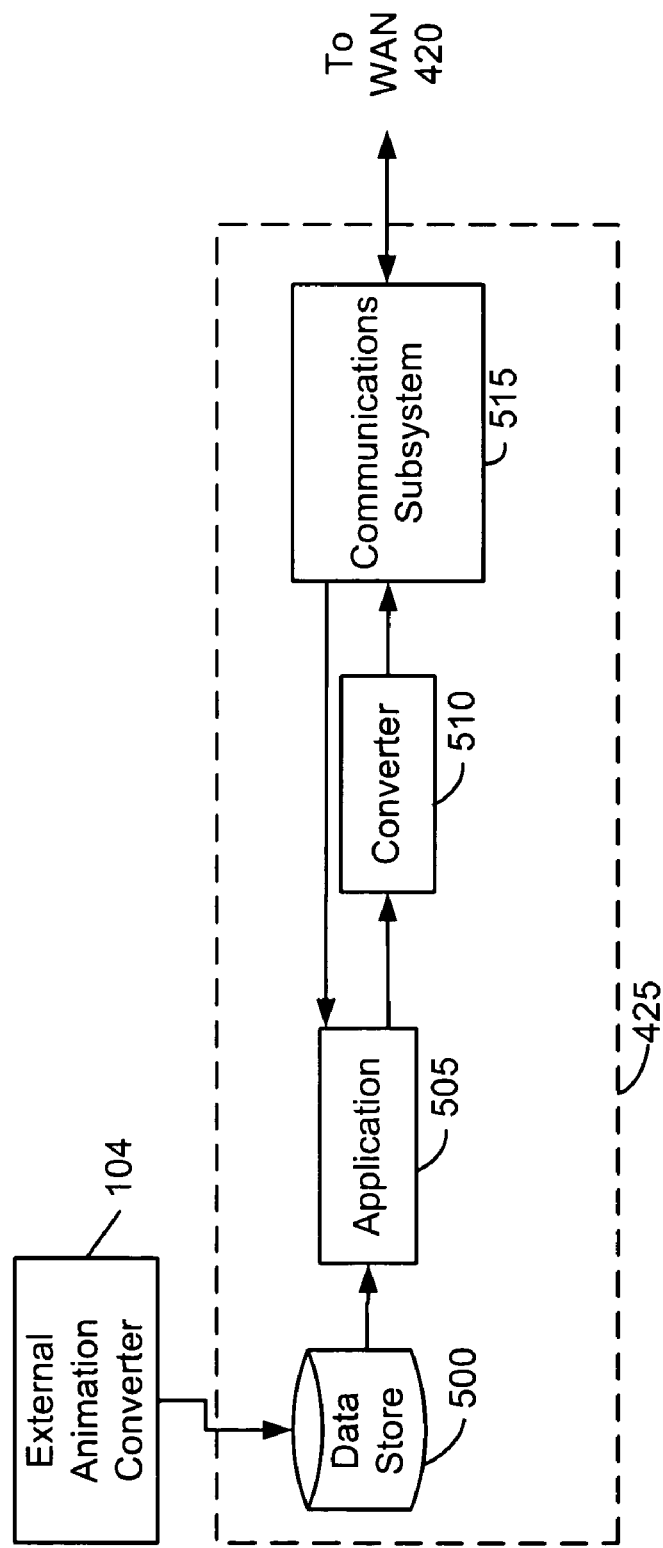
FIG. 5 is a block diagram of the content provider system of FIG. 4.

FIG. 5 is a block diagram of the content provider system of FIG. 1. The content provider system 425 comprises a data store 500 for storing the content, an application 505 to access and process the content for presenting on the media devices 405, a converter 510 for converting the content into the binary format, an external animation converter 104 for converting content for storage in the data store 500, and a communication subsystem 515 for sending the content in binary format.

The data store 500 stores the content on a hard disk of a server computer in which the content provider system 425 is implemented. The content is authored and stored in eXtensible Markup Language (XML) and, in particular, in the Scalable Vector Graphics (SVG) format of XML for graphics including animations. In the presently described embodiment, the content includes interpolator-based animations 106 that are stored in SVG format. Thus, the external animation converter 104 converts frame-based content to the interpolator-based content for storage in the data store 500.

The application 505 includes an application server. Alternatively, the application 505 may comprise an application executing on an application server. Alternatively, the application 505 may further comprise an application for a particular service executing on an application server.

The converter 510 processes the content for rendering on the media devices 405. This processed content is provided in the binary format to further lessen processing at the media devices 405. Thus, some of the content processing is off-loaded from the media devices 405 to the content provider system 425.

The media devices 405 request content from the content provider system 425 via standard HTTP requests and, in response, the content provider system 425 provides the content in binary format to the media devices 405, where the content is displayed and content-related operations, including user inputs, are performed.

Alternatively, the data store 500 may be an external data store, including a web server for example, accessible to the content provider system 425 through a network or other connection.

While the content provider system 425 as described includes an external animation converter 104 which converts rich content from a frame-based format to the SVG interpolator based format and a converter 510 which converts from SVG to a binary format, either or both conversions may alternatively be performed by either the converter 510 or the external animation converter 104. For example, the combined converter may convert both from frame-based content to interpolator-based SVG, and from SVG to the binary format, so that frame-based content could be stored in the data store 500 and converted into the binary format following a request for the content.

Like the gateway 415 and the media devices 405, the design of the communication subsystem 515 in the content provider system 425 depends upon the communication networks and protocols used by the content provider system 425. The communication subsystem 515 includes such components as are required to communicate within the WAN 420. Those skilled in the art will appreciate that the communication subsystem 515 may also include systems for processing content requests, where content is provided in response to requests. The communication subsystem 515 may also include further or alternate systems and arrangements commonly associated with content provider systems.

Figure 6:
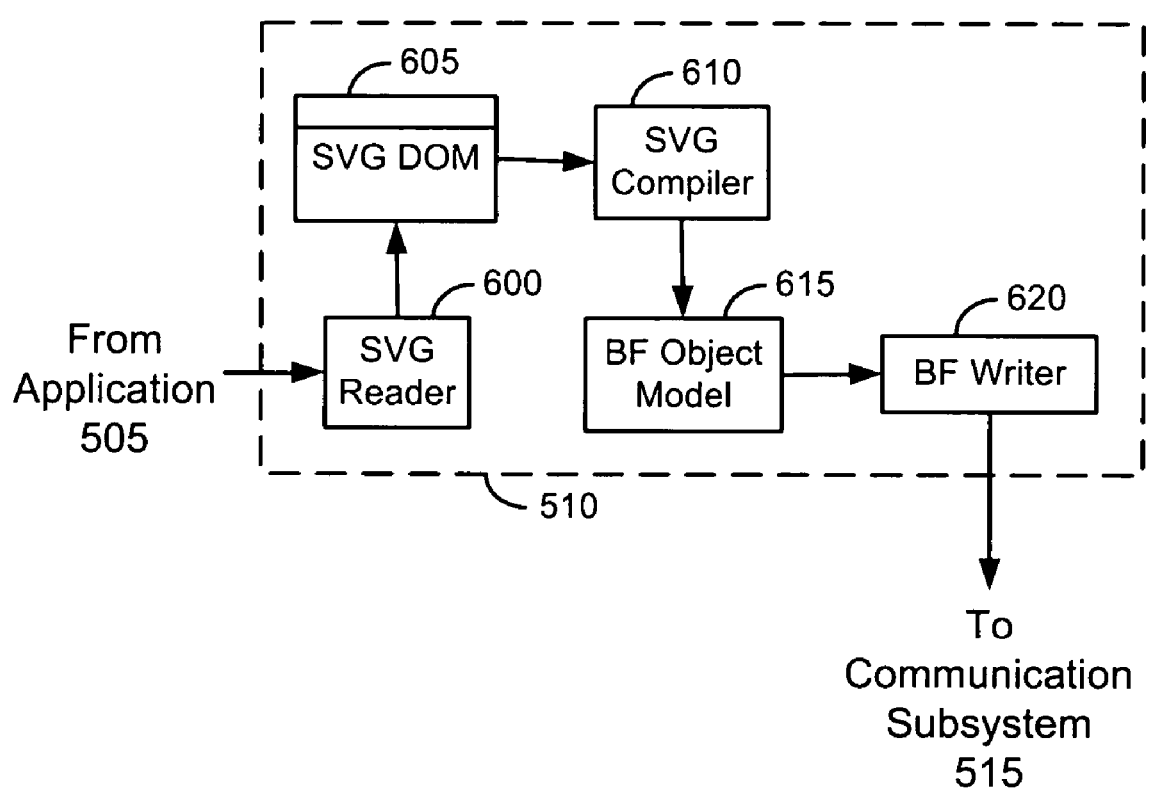
FIG. 6 is a block diagram of the converter of FIG. 5.

FIG. 6 is a block diagram of the converter 510 of FIG. 5. The converter 510 comprises an SVG reader 600 for reading the content in SVG and formatting the content into an SVG Document Object Model (SVG DOM) 605, an SVG compiler 610 for converting the SVG DOM 605 to a binary format (BF) Object Model 615, and a BF writer 620 for writing the BF Object Model 615 of the content into the binary format.

The SVG DOM 605 is an in-memory version of the content for access by the SVG compiler 610. The BF Object Model 615 is an in-memory version of the content as rendered on the media devices 405. The SVG Compiler 610 filters the SVG DOM 605 to discard elements of the DOM that are not supported by the BF Object Model 615 and then the filtered SVG DOM 605 is analyzed and built into the BF Object Model 615. The binary format is substantially a memory map or dump of the BF Object Model 615 plus the header.

As noted above, the external animation converter 104 includes, in an example embodiment, a frame-based animation input module 200, a conversion module 202, and an interpolator-based animation output module 204. The frame-based animation input module 200 receives a frame-based animation, which is an example of frame-based content which is converted by the animation converter 104, as input. In addition to the content described above frame-based animations can also contain script, which is a sequence of commands written in a scripting language. Script is included in a frame-based animation and is executed by software displaying the animation in response to actions such as button actions and frame actions. Button actions occur when a user clicks a mouse pointer on an animation object such as a button. Frame actions occur when a frame containing the script is displayed.

Script commands which can be included in a frame-based animation include a get-URL command, which loads content from a network location specified by a Uniform Resource Locator (URL). Script commands further include a tell-target command, a play command, and a stop command. The tell-target command specifies a target sprite to which subsequent play and stop commands apply. The play command specifies that display of the target sprite should commence, while the stop command specifies that the display of the target sprite should cease. The set of script commands which can be used in the system and method described is not limited to the script commands described above.

As noted previously, based on the output of frame-based animation input modules 200, the conversion module 202 creates a map comprising a key for each unique combination of one of the animation objects in the displayed groups and one of the depth values associated with the animation object. Each key comprises a unique identifier for the animation object and the depth value. Each key maps to a table which comprises a set of key-times corresponding to positions of the frames, the display properties of the animation object, values of the display properties for each of the key-times, and a duration value which is calculated based on the frame-rate.

The interpolator-based animation output module 204 then creates and outputs an interpolator-based animation in SVG format. The interpolator-based animation comprises the animation objects and a plurality of interpolators. For each of the display properties in each of the tables in the map, one of the interpolators comprises a target animation object which is the animation object identified in the key which maps to the table, a target display property which is the display property, the key-times included in the table, the values of the display property included in the table, and the duration value included in the table.

Each interpolator created by the interpolator-based animation output module 204 is outputted as an SVG animate tag. Script contained in the frame-based animation is also outputted in SVG format, as described below. The SVG content outputted from the external animation converter 104 is inputted into the data store 500, at which point the content is available to the application 505.

Figure 7:
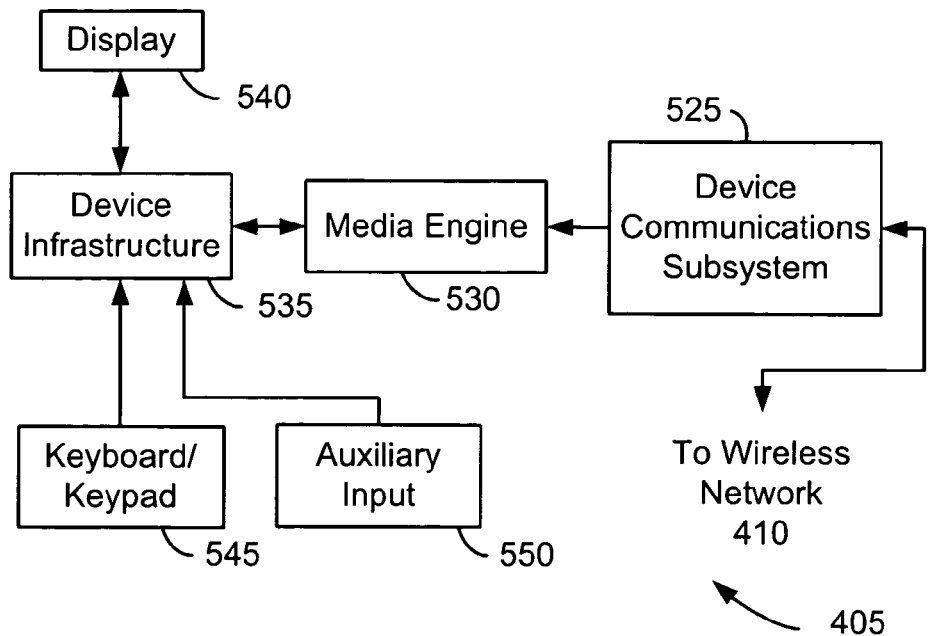
FIG. 7 is a block diagram of one of the media devices of FIG. 4.

FIG. 7 is a block diagram of one of the media devices of FIG. 4. The media device 405 comprises a device communication subsystem 525 for interfacing with the wireless network 410 to receive the content and to send content related requests such as user inputs, a media engine 530 for reading and rendering the received content including interpreting content related requests, a device infrastructure 535 with memory for supporting the operations of the media device 405, a display 540 for presenting the content, and a keyboard/keypad 545 and an auxiliary input device 550 for receiving the user inputs. The user inputs include requests for content from the content provider system 425. The auxiliary input device 550 includes a rotatable thumbwheel, a special function key, and a pointer.

The media engine 530 enables such rich content operations as image rendering, sprite animation rendering, filled and unfilled rectangle rendering, polygon, point, and polyline rendering, text rendering, and text font and style selection. Such advanced operations as constant, linear and cubic animation paths, object positions and color, and audio clip rendering are also preferably supported by the media engine 510.

Figure 8:
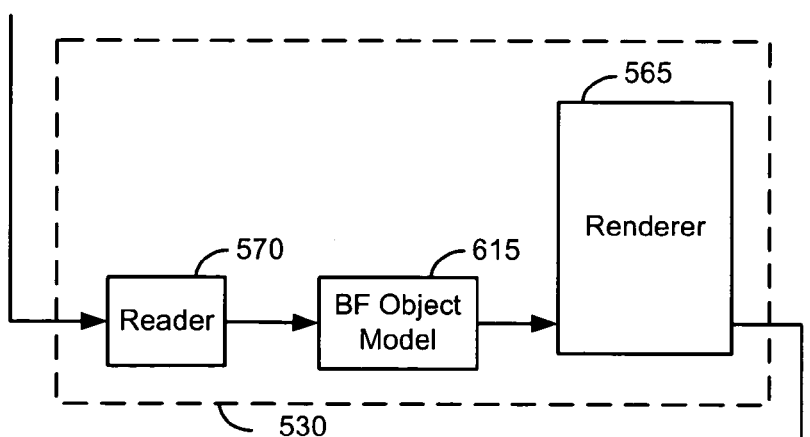
FIG. 8 is a block diagram of the media engine of FIG. 7.

FIG. 8 is a block diagram of the media engine of FIG. 7. The media engine 530 comprises a reader 570 for reading the received content in binary format, formatting the received content to the BF Object Model 615 and placing in the memory of the media device 405, and a renderer 565 to render the received content, the BF Object Model 615, for presenting on the display 540 and for supporting content-related operations.

Figure 9:
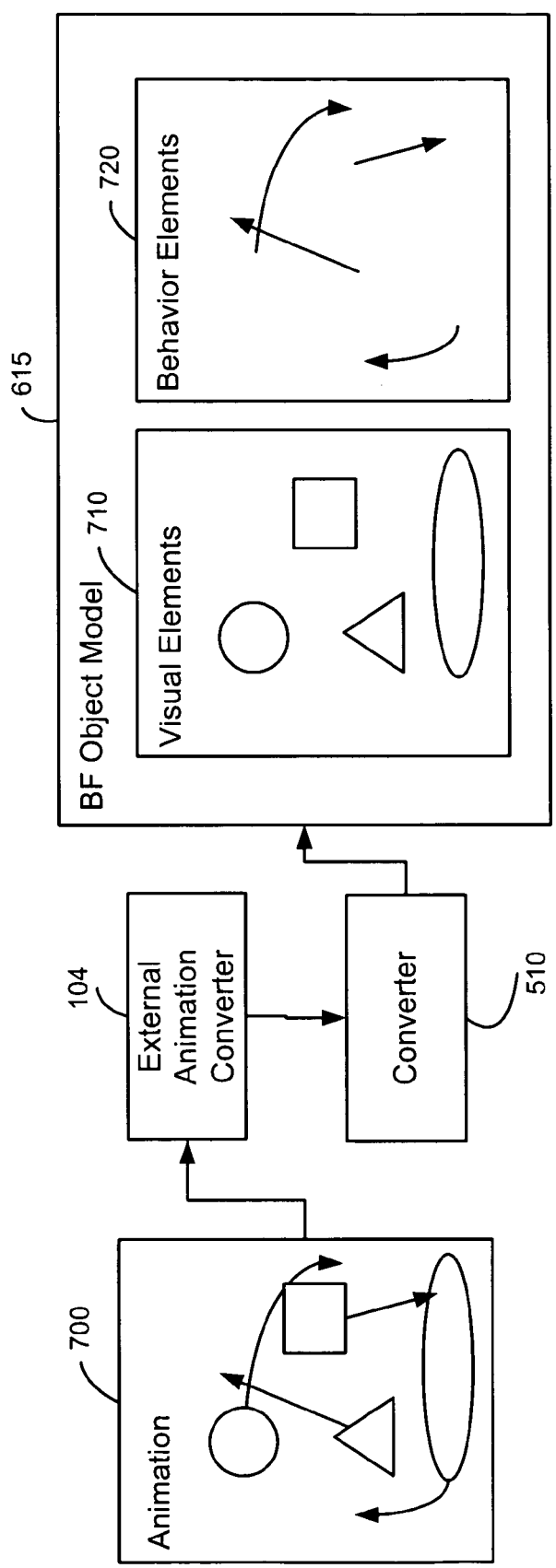
FIG. 9 is a block diagram of a conversion of an animation.

FIG. 9 is a block diagram of a conversion of an animation. The animation 700 is an example of rich content provided by the content provider system 425. The animation 700 is converted first by the external frame to interpolator-based animation converter 104, and then by the converter 510. For simplicity, the remaining elements of the content provider system 425 are not shown in FIG. 7.

The external converter 104 converts the animation 700 from a frame-based format to the SVG format, as described above. As those skilled in the art will appreciate, the animation 700 in the SVG format has visual elements associated with behavior elements, and is represented by an SVG DOM 605. The converters 104, 510 separates the animation 700 into visual elements 710 and behavior elements 720, and builds the BF Object Model 615 with separate visual and behavior elements. The visual elements 710 include text, lines, colors, and shapes, whereas the behavior elements 720 include operations, such as changing colors and changing positions of the visual elements 710 over time.

Figure 10:
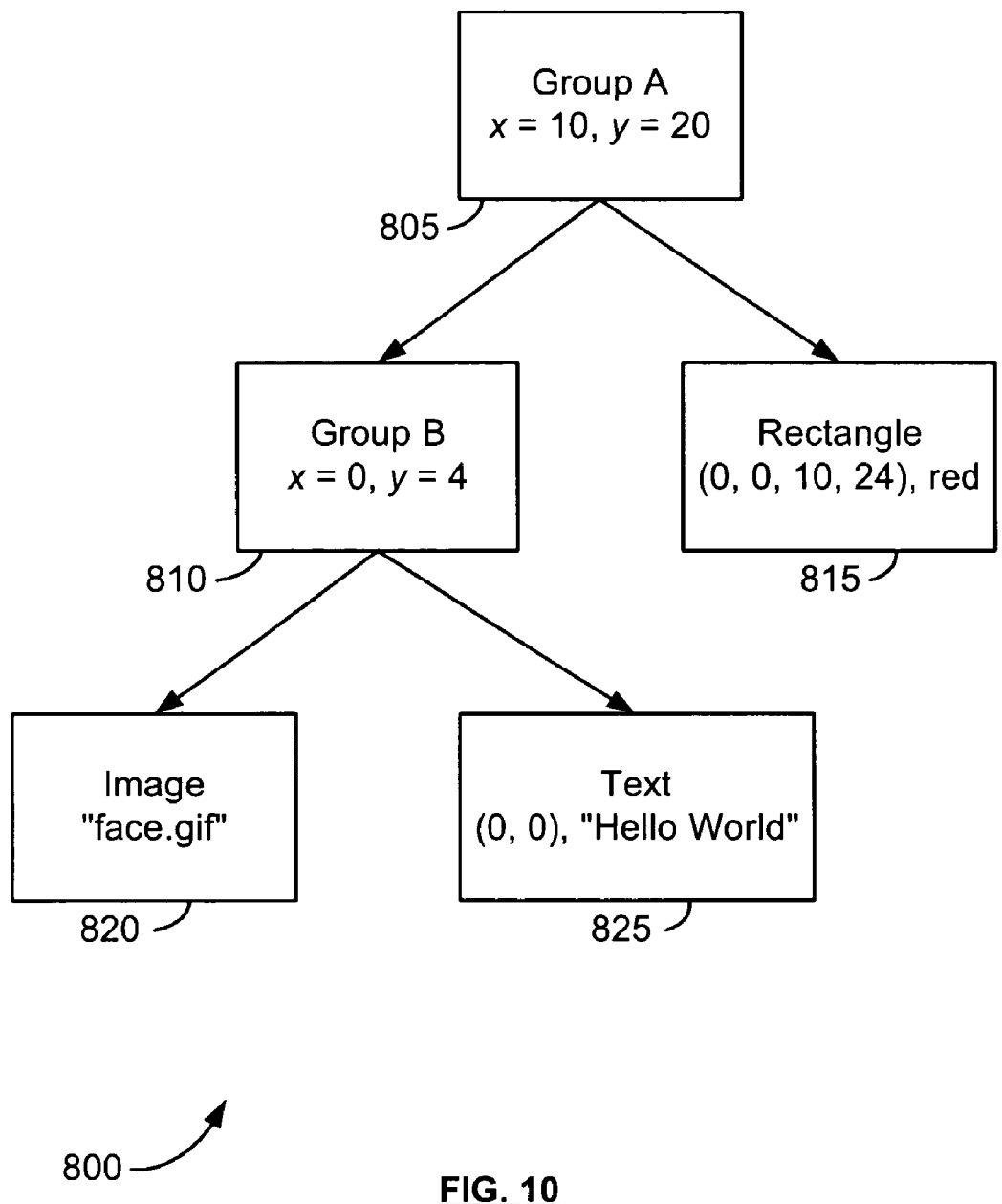
FIG. 10 is a block diagram of an example of the visual elements of FIG. 9 represented as a visual graph.

FIG. 10 is a block diagram of an example of the visual elements 710 of FIG. 9 represented as a visual graph. The visual graph 800 is composed of nodes, including groups and leaves, as shown. The visual graph 800 includes two groups, namely group A 805 and group B 810, and three leaves, namely the rectangle 815, image 820, and text 825. A group represents a transformed sub-universe, whereas leaves represent visual objects and attributes such as images, text, and primitives including lines, ellipses, and rectangles. The top level group A 805 has two children, one of which is the group B 810 and the other of which is a leaf, the rectangle 815. The group B 810 has two children of its own, each of them a leaf, namely the image 820 and the text 825. Grouping of nodes in a visual graph allows transformations, such as translations and rotations for example, to be applied to all elements of a group. The group nodes 805, 810 are also used to set graphics coordinates to be used when rendering visual elements in a group or subordinate group.

The rectangle 815 is a primitive that is a rectangle with its top left corner at coordinates 0,0, a length of 10 pixels, a height of 24 pixels, and a color of red. The image 820 is an image of a face in GIF format. The text 825 is a text leaf with the text "Hello, World" starting at coordinates 0,0.

At the media device 405, the visual graph 800 is rendered by processing the nodes in a predetermined order, by starting at a root node and traversing leftmost nodes first (i.e. pre-order traversal). In the visual graph 800, the root node, the group A 805, is processed first. The group A 805 resets an origin of a graphics coordinate system for all elements in its sub-universe to coordinates x=10 and y=20. Therefore, all rendered components in the sub-universe of group A 805 are drawn relative to the translated origin at 10,20.

Traversing the visual graph 800 in a pre-order traversal, the group B 810, is processed next, which further translates the origin of the graphics coordinate system along a y axis. The visual elements in the sub-universe of group B 810 are rendered relative to its origin at 10,24. The image 820 is processed next and the image "face.gif" is displayed on the display 520 at the group B 810 origin of 10,24. Since the image 820 is a leaf, the rendering process returns to the group node, the group B 810, and then proceeds to the text 825. The text "Hello, World" is then drawn starting at coordinates 0,0 in the sub-universe of the group B 810, which is at absolute coordinates 10,24. The text 825 is also a leaf, such that the rendering process returns to the group node, the group B 810. Since all of the children of the group B 810 have been processed, control then returns to the group A 805 and graphical coordinates are reset to the sub-universe of the group A 805, with origin at 10,20. The rectangle 815 is then rendered to draw the red rectangle, at the origin of its sub-universe (10,20).

An algorithm, such as the SVG painter's model, is used to control the appearance of overlapping visual elements on a display screen. According to this algorithm, each visual element drawing operation "paints" over some area of an output device display screen. When this area overlaps a previously painted area, the new paint partially or completely obscures the old. Each visual element is drawn over any overlapping portions of previously drawn elements at the same location on the display screen. Therefore, background visual elements, which are to appear "deeper" in a displayed scene, are located in a visual graph so as to be drawn first, and foreground elements are drawn on top of previously drawn elements. In the visual graph 800, the red rectangle 815 is drawn on top of any overlapping sections of the previously drawn "face.gif" image 820 and the text "Hello, World" 825.

The visual graph 800 is an example and is intended for illustrative purposes only. The structure and arrangement of any visual graph will depend upon the visual elements in a scene to be displayed. Different elements than those shown in FIG. 8 may have further or different attributes. For example, an ellipse may be defined by its center location and the lengths of its major and minor axes, instead of the corner location, width and height shown for the rectangle in leaf 815. A rectangle or other shape may include further or alternative attributes than those shown in leaf 815, such as a different corner or center location instead of top left corner coordinates, fill properties, and line type designations. Similarly, text visual elements may have such attributes as font, color, and size.

Figure 11:
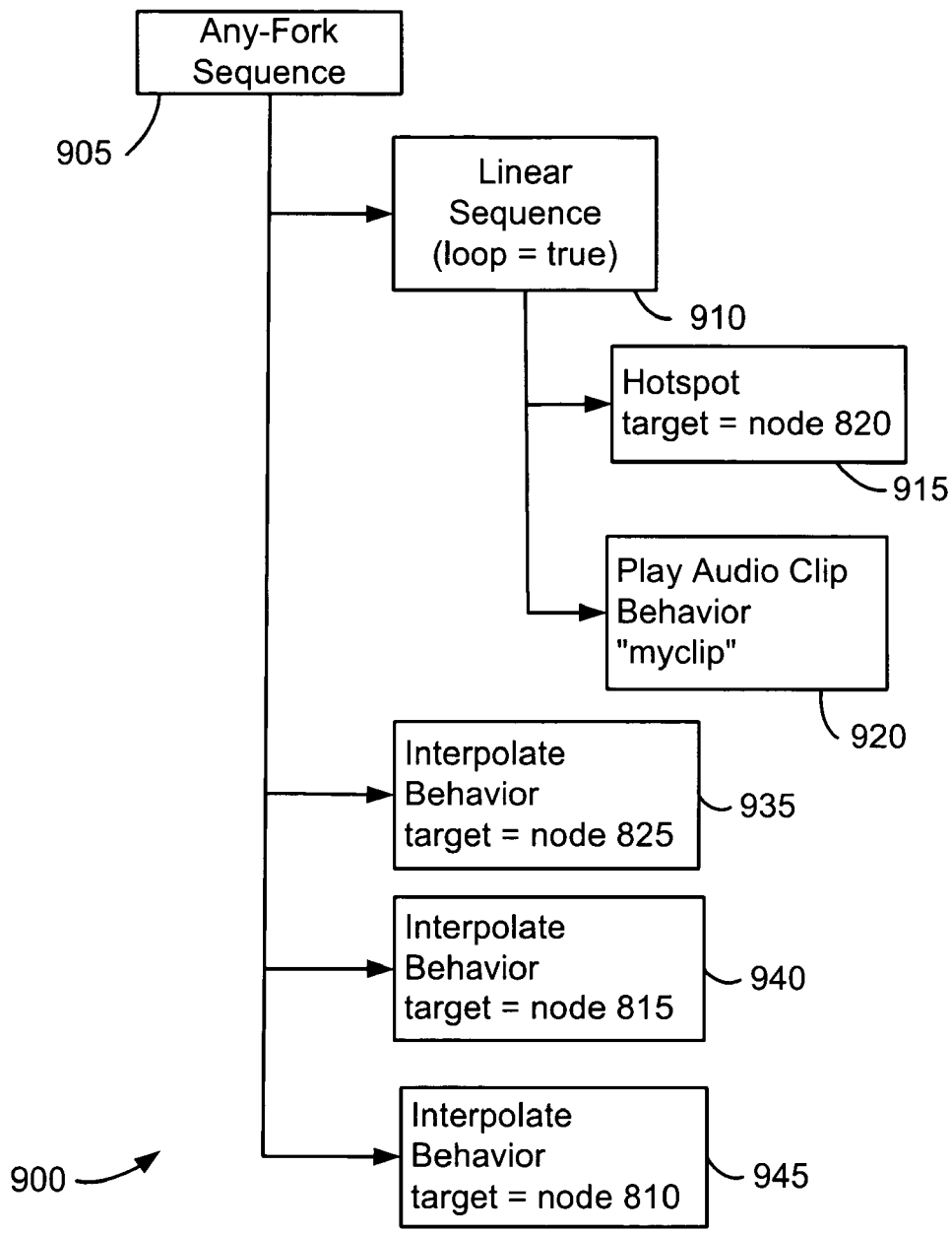
FIG. 11 is a block diagram of an example of the behavior elements of FIG. 9 represented as a sequence graph.

FIG. 11 is a block diagram of an example of the behavior elements 720 of FIG. 9 represented as a sequence graph. The sequence graph 900 is based on the premise that the visual elements 710 have time-based behaviors. These time-based behaviors are used to construct behaviors that are used to both schedule the animation 700 and make it behave as intended. The behavior elements 720 reference the visual elements 710 as necessary to apply the appropriate behaviors to create the animation 700.

It will be apparent to those skilled in the art that the animation 700 in SVG format requires a scheduler in order to manage the behaviors of visual elements. Separation of the behavior elements 720 in the sequence graph 900 from the visual elements 710 in the visual graph 800 in accordance with this aspect of the invention does not need a separate scheduler to process the animation 700. Scheduling is inherent in the sequence graph 900, which reduces the requirements of the media engine 530 and further provides a method of providing thread-safe converted content.

The sequence graph 900 describes how a scene behaves over time. The sequence graph consists of behaviors and behavior sequencers. Behaviors include such operations as hotspots, hyperlinks, keypad events, text entry, animation/interpolation, timers, variable settings, play/stop audio, visual graph modification, and other behaviors. The behaviors are bounded by such behavior sequencers as linear sequences, all-fork, any-fork, and if-else-fork sequencers.

A hotspot is a special aggregated sensor/behavior that allows visual elements in the visual graph of a scene to be tagged as hotspots. This allows behaviors to be executed depending on the status of navigation of those hotspots using a cursor, pointer or the like, on a device on which the scene is displayed. Hyperlinks are used to load more content from the network and are similarly dependent upon navigation and selection of a visual element on a display screen. Keypad events and text entry may also invoke other dependent behaviors.

Animation and interpolation are behaviors that apply to attribute data of various objects. An interpolation, for example, may define an interpolation curve along which one or more visual elements may be moved. Timers are used to set pauses of specified duration. Variable settings set the value of a variable or attribute. Play/Stop audio behavior provides for controlled playing of an audio clip. An audio clip may be played in its entirety, stopped after a predetermined time duration, using a timer, for example, or stopped when a user navigates to a display screen hotspot, for example.

Some of these behaviors affect visual elements of an animation. When a visual element is to be changed, the sequence graph references the appropriate element of the corresponding visual graph and modifies the element in the visual graph. The visual graph is then rendered again to reflect changes to visual elements.

A behavior sequencer controls the execution of its associated behaviors or child nodes in a sequence graph. One such behavior sequencer is a linear sequence, in which each child node is executed in order. A linear sequence is completed when all of its child nodes have finished executing. Looping may be enabled or disabled in any linear sequence, and each child node is executed during each pass of the loop. A loop in a linear sequence is complete when all child nodes have finished executing, whereas an entire looped linear sequence is completed when all of its child nodes have been executed a particular number of times specified in the linear sequence behavior sequencer in the sequence graph. If a linear sequence is to continue indefinitely, then infinite looping is specified.

Another behavior sequencer is an all-fork sequence. An all-fork sequence is completed when all of its child nodes have finished executing. An any-fork sequence is similar in that it is completed when any of its child nodes has finished executing. The all-fork and any-fork sequences emulate multi-threading for processing on resource-limited devices so that the spawning of more threads is more easily controlled.

An if-else-fork sequence is a further behavior sequencer, which conditionally executes different ones of its child nodes dependent upon the state of a sensor. For example, an if-else-fork sequence having two child nodes may execute one child node when a sensor is active, in that a condition monitored by a sensor is detected, whereas the other child node may be executed when the condition is not detected. The sensor function is abstract and may represent such device-related conditions as a key depression or release, and receipt of a communication signal.

Each behavior sequencer may itself also be a parent or child node of any other behavior sequencer. Using combinations of behavior sequencers and behaviors, many different scene behaviors may be emulated by constructing a sequence graph based on original rich content.

The present invention is in no way limited to the above example behaviors and behavior sequencers. Content converters and content providers may be configured to handle new behaviors and behavior sequencers developed to support additional rich content functionality on devices.

Time-based behaviors have a beginning and an end. A sequence graph is scheduled from an outermost behavior to one or more innermost behaviors and is run until the outermost behavior is finished.

The sequence graph 900 is representative of the timed operation of time-based behaviors, with the outermost timed loop indicated by the top member of the graph. In FIG. 11, an any-fork behavior sequencer 905 is the outermost behavior that controls the operation of this scene. Below the any-fork node 905 is a loop represented by linear sequence 910 with the argument "loop=true", indicating that looping is enabled. This loop includes a hotspot 915 which specifies a target node which is the image 820 in visual graph 800, and a play audio clip behavior 920. In this loop, the activation of the hotspot 915 by navigating a cursor or pointer over the hotspot 915 causes an audio clip, designated "myclip" in FIG. 11, to be played by the play audio clip behavior 920. The clip plays until it is completed, at which time the hotspot 915 may be activated to play the clip again.

The interpolate behaviors 935, 940, 945 translate their respective target objects by interpolating new object positions based on an interpolation curve and an elapsed time since the behavior was last executed. The interpolate behaviors 935, 940, 945 respectively move the "Hello, World" text 825, the rectangle 815, and group B 810, which comprises the "face.gif" image 820 and the "Hello, World" text 825.

The visual graph 800 and the sequence graph 900 are processed by the media engine 530 in a series of passes. In each pass, elements in the graphs are processed. Processor time allotments are provided to each of the elements as needed by the elements.

This time allotment may be managed in a variety of ways, including, for example, sharing a predetermined single pass time between all behaviors in a sequence graph or allowing each behavior to complete a particular portion of its associated operations in each pass.

Alternately, a processor may also track execution times of each pass and possibly each behavior, such that time-dependent behaviors may determine an elapsed time since its preceding pass, cumulative execution time (i.e. total elapsed time since the beginning of the first pass), and possibly other times associated with sequence graph processing, as required.

A first pass through the sequence graph 900, for example, proceeds as follows. The outermost behavior sequencer, the any-fork sequence 905, controls the completion of the sequence graph operations. As described above, an any-fork sequence is completed when any one of its children has finished executing. In the sequence graph 900, the linear sequence 910 is processed first. The first behavior, the hotspot 915, is allowed to execute to perform one or more particular functions.

Interpolate behaviors preferably have a specified total duration, such that associated translation operations are executed for a certain period of time before ending. The total duration typically is specified as a measure of time, but may instead be specified as a particular length along an interpolation curve, a number of cycles around a closed interpolation curve or some other type of limit controlling the execution of the behavior.

An interpolate behavior effectively calculates a new position for a target object based on an interpolation curve, an amount of time elapsed since a preceding pass through the behavior, and possibly a preferred animation "speed". For example, in the first pass through the sequence graph 900, the interpolate behavior 935 calculates a new position for the "Hello, World" text 825 by interpolating a new position on an interpolation curve using an elapsed time since the beginning of the first pass through the sequence graph. An interpolate behavior effectively calculates a distance along the interpolation curve that the target object should have moved in the elapsed time and thereby determines new coordinates for the target object. In each pass through a sequence graph, the interpolate behavior 935 executes one interpolation calculation.

An interpolation curve may be of virtually any shape and size, depending upon the desired movements to be applied to a visual object. It should be appreciated that interpolation curves are used by interpolate behaviors but are not necessarily visual objects in a visual graph. Where one visual element is intended to move along a path that traces another visual element however, an interpolation curve may be established based on an element in a visual graph. In this case, an interpolate behavior may reference a non-target object in the visual graph to determine an interpolation curve to be used to control the behavior of another object, the target object, in the visual graph.

Each of the interpolate behaviors 935, 940, 945 may, for example, use a different type of interpolation curve for its respective target object. For example, behavior 935 may use a circular interpolation curve to move the text in a circular pattern, such as around the image "face.gif", whereas behavior 940 may animate the rectangle back and forth along a straight-line interpolation curve. The behavior 945 may then move both the text, which is moving around the image, and the image, in a rectangular pattern around the edges of a display screen.

Thus, in a first pass through the sequence graph 900, the hotspot behavior 915 establishes its target, the image 820, as a hotspot, and interpolate behaviors 935, 940, 945 all interpolate new positions for their respective targets and reference their targets in the visual graph 800 to move the visual elements 710 to their new positions on the display 540 accordingly.

A second pass through the sequence graph 900 then begins. For the purposes of this example, it is assumed that none of the behaviors have finished executing in the first pass through the sequence graph 900. The any-fork sequence 905 determines the status of its children by checking "finished" or similar flags or indicators, which are associated with and may preferably be set by each behavior. When a behavior finishes executing, it may set a finished flag to true, for example. In the sequence graph 900, the any-fork sequence 905 ends processing of the sequence graph when any one of its children has set its completed flag.

In the second and subsequent passes through the sequence graph 900, each behavior resumes at whatever point it reached in the preceding pass. The linear sequence 910 is not yet complete, and resumes with the hotspot behavior 915 to determine if the user has navigated to or over the hotspot image. To this end, user inputs may be queued or cached in a memory on a device and processed during sequence graph operations.

The hotspot behavior 915 checks the input queue to determine if a user has navigated a cursor or other screen pointer over the hotspot. If so, the behavior 915 is finished and a finished flag is set to true to indicate to the linear sequencer 910 that it has completed. The play audio clip behavior 920 is then started and a part of the audio clip "myclip" is played. Control then passes to the interpolate behaviors 935, 940, 945, which in turn determine new positions for their respective target objects for rendering.

In the next pass, the any-fork sequence 905 again checks to see if any of its behaviors have finished and if so, the sequence is completed. Otherwise, another pass through the sequence graph 900 is performed. In this pass, the hotspot behavior 915 has finished, so the linear sequence 910 proceeds with the play audio clip behavior 920 to play another part of "myclip". New positions of targets 825, 815, 810 are determined, and the visual elements 710 are modified and rendered again.

Since looping is enabled in the linear sequence 910, the sequence repeats once all of its child behaviors have completed. Therefore, the any-fork sequence 905 completes when one of the interpolate behaviors 935, 940, 945 finishes. In a subsequent pass, the any-fork sequence 905 detects the finished flag, or possibly otherwise determines that one of its children has finished executing, and the sequence graph processing ends.

The visual graph 800 and the sequence graph 900 are shown in FIGS. 10 and 11 for illustrative purposes only. An animation may include fewer, more and different visual elements in a visual graph and behaviors and sequencers in a sequence graph. This provides for flexibility in defining many different animations or scenes, which may include a multitude of effects and animations. The interpolate sequences represent only one example of effects that may be applied to visual elements in a visual graph. Any attributes of visual elements in a visual graph, including position, size and color for example, may be modified. Visual elements and groups in a visual graph may also preferably be moved in other ways than being translated along an interpolation curve. For example, target objects in a visual graph may also or instead be rotated. Many other effects could also be defined to emulate effects in original rich content, and are within the scope of the present invention.

Figure 12:
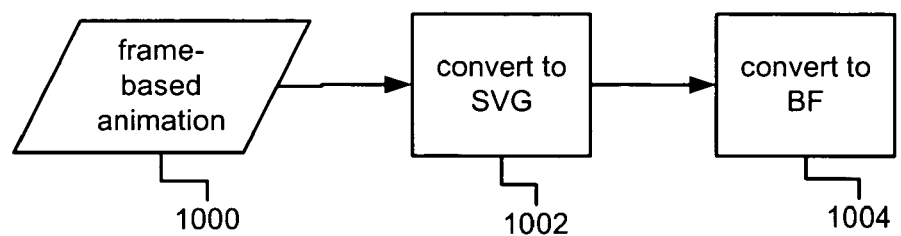
FIG. 12 is a flowchart of a method of converting rich content into a binary format.

FIG. 12 is a flowchart of a method of converting rich content into a binary format. The rich content is a frame-based animation 1000, as described above. The frame-based animation 1000 is first converted (by animation converter 104) into SVG format at step 1002. The animation of the animation objects in the frame-based animation 1000 is converted into SVG animate tags, as described above. The SVG content created at step 1002 is then converted (by converter 510) into a binary format (BF) at step 1004. The BF content comprises a visual graph and a sequence graph, as described above.

The frame-based animation 1000 may also contain script, including get-URL, tell-target, play and stop commands, as described above. Get-Url commands are converted into SVG anchor tags, which are denoted with "a" tags in the SVG content created at step 1002, and which specify an attribute value containing the URL of the content to be loaded. Alternatively, get-Url commands may be converted into "loadScene" tags, which specify the URL of the content to be loaded and a trigger condition which specifies when the content is to be loaded. The tags are then converted into hyperlink nodes in the binary format created at 1004. Tell-target, play and stop commands specify a sprite animation and when it should be played. This information is specified by SVG animate tags at step 1002, which are converted into interpolate behaviors in the sequence graph at step 1004.

Script is executed in response to button actions and frame actions in the frame-based animation 1000. A frame action can be expressed as a time-offset from the beginning of the animation at which the script is executed. The time-offset is represented by a begin-attribute in the animate tag in the SVG content created at step 1002. The begin-attribute specifies the amount of time which passes after the beginning of the animation before the script is executed. The offset is represented in the sequence graph created at step 1004 by an interpolate behavior which has no target animation object. The interpolate behavior thus takes time to execute and has no effect on the display of the rich content.

When the interpolate behavior is completed, processing of the sequence graph continues with nodes in the sequence graph which correspond to script in the frame-based animation 1000.

Button actions are represented in the SVG created at step 1002 by anchor tags, or by "begin" attributes of animate or "loadScene" tags, which are used to specify the trigger condition of a corresponding button action. Button actions are represented in the sequence graph created at step 1004 by hotspot behaviors. Nodes corresponding to the script in the frame-based animation are descendents of the hotspot behavior in the sequence graph, so that when the target animation object specified by the hotspot behavior is activated, the part of the sequence graph that corresponds to the script in the frame-based animation 1000 is executed.

The sequence graph nodes representing the frame-based animation 1000 are descendent nodes of a linear sequence behavior sequencer. If the frame-based animation 1000 loops, then the linear sequence specifies that looping is enabled. Any-fork and all-fork behavior sequencers are used to control the execution of the sequence graph, as described above, so that the BF content created at step 1004 is equivalent to the frame-based animation 1000, in that they appear the same when they are displayed.

The BF content that is created at step 1004 is a binary representation of the frame-based animation 1000. The BF representation minimizes the amount of data required to represent the rich content, thus minimizing the time required to transmit the data across a network and the amount of storage space required to store the content on a device such as a mobile communication device or a personal computer. In addition, where the frame-based animation 1000 comprises frames and animation objects and further comprises script, the BF content created at step 1004 represents the same content with only a visual graph and a sequence graph. Therefore, no scripting support is required for software which renders rich content in BF format.

Figure 13:
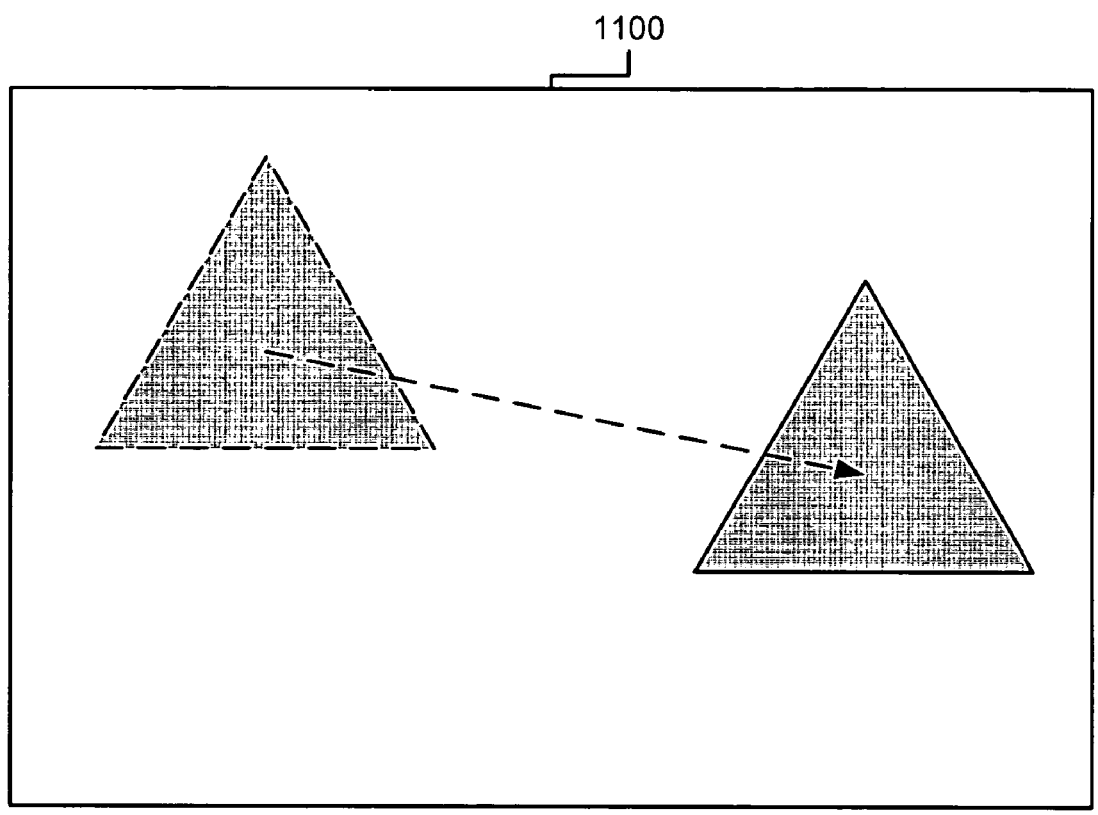
FIG. 13 is a block diagram of an example animation.
Figure 13:
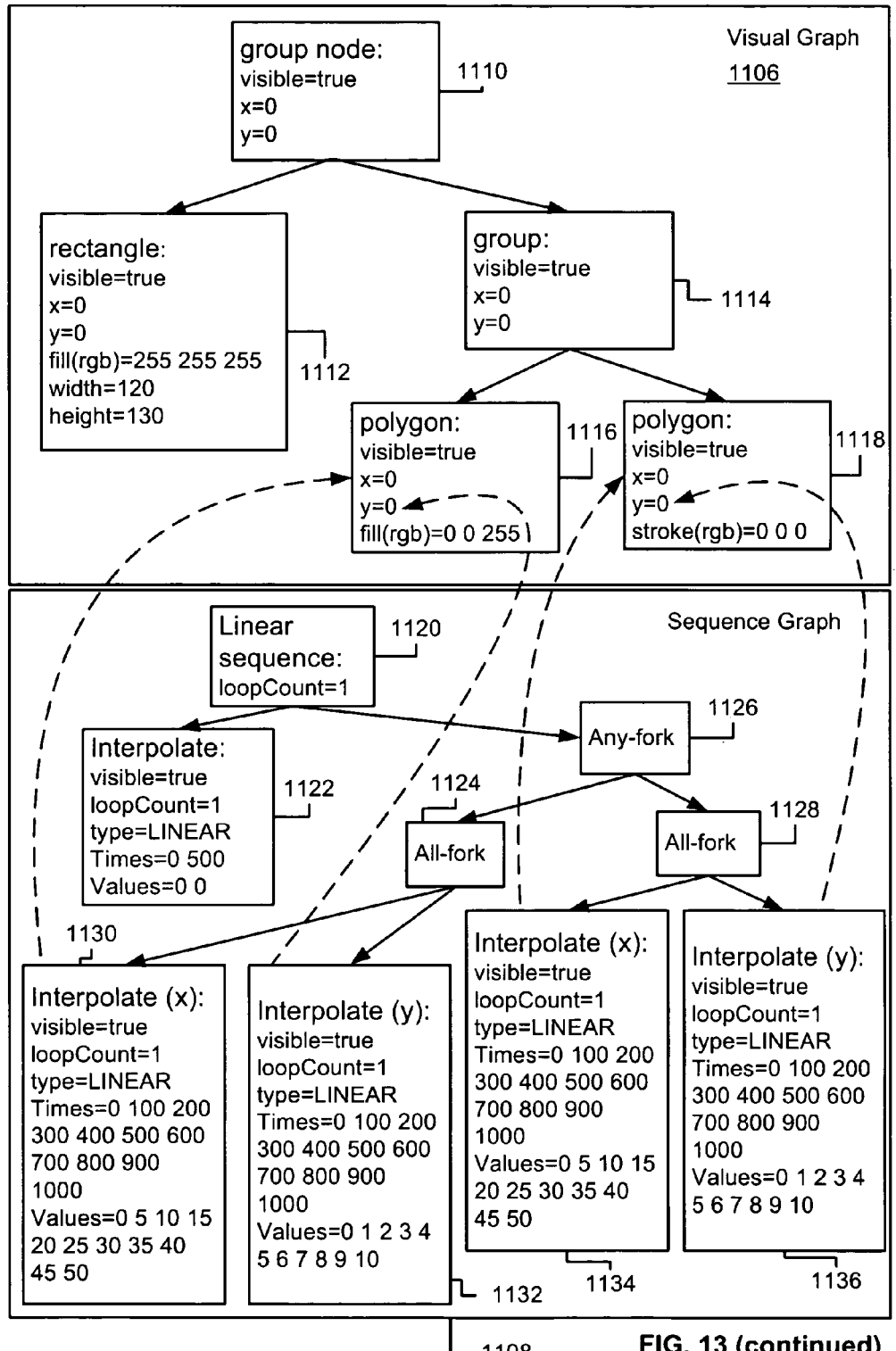

FIG. 13 is a block diagram of an example animation. The visual representation 1100 of the animation illustrates a triangle which is moving downward and to the right. The animation is represented by frame-based content 1102 which includes script. The script includes tell-target and play script commands which are to be executed in response to frame actions. When converted into SVG as described above, the animation is represented by XML code 1104. The XML code 1104 includes an interpolator 120 in the form of an "animateTransform" tag, which is an example of an animate tag which displays the sprite specified by the script commands in the frame-based content 1102. The XML code also includes an animation object 116 as defined by a path element. As seen in XML code 1104, the "animate Transform" tag specified a target display property "transform", a duration "dur", and a plurality of key times, with values for the target display properties at each of the key times.

When the XML code 1104 is converted into BF content as described above, the animation is represented by a visual graph 1106 and a sequence graph 1108. The animation objects included in the animation are represented by the rectangle node 1112, polygon nodes 1116, 1118, and group nodes 1110, 1114 in the visual graph 1106. The linear sequence node 1120 is the outermost node of the sequence graph 1108, which controls the display of the animation. The interpolate node 1122 which does not specify a target is executed first, creating a time offset which corresponds to the frame action in response to which the script in the frame-based content 1102 is to be executed. Once the interpolate node 1122 has finished executing, the all-fork node 1126 executes the any-fork nodes 1124, 1128, which in turn execute the interpolate nodes 1130, 1132, 1134, 1136 which specify target nodes in the display graph 1106, thus displaying the sprite specified by the script commands in the framed-based content 1102. The times listed in the interpolate nodes are represented in milliseconds.

Figure 14:
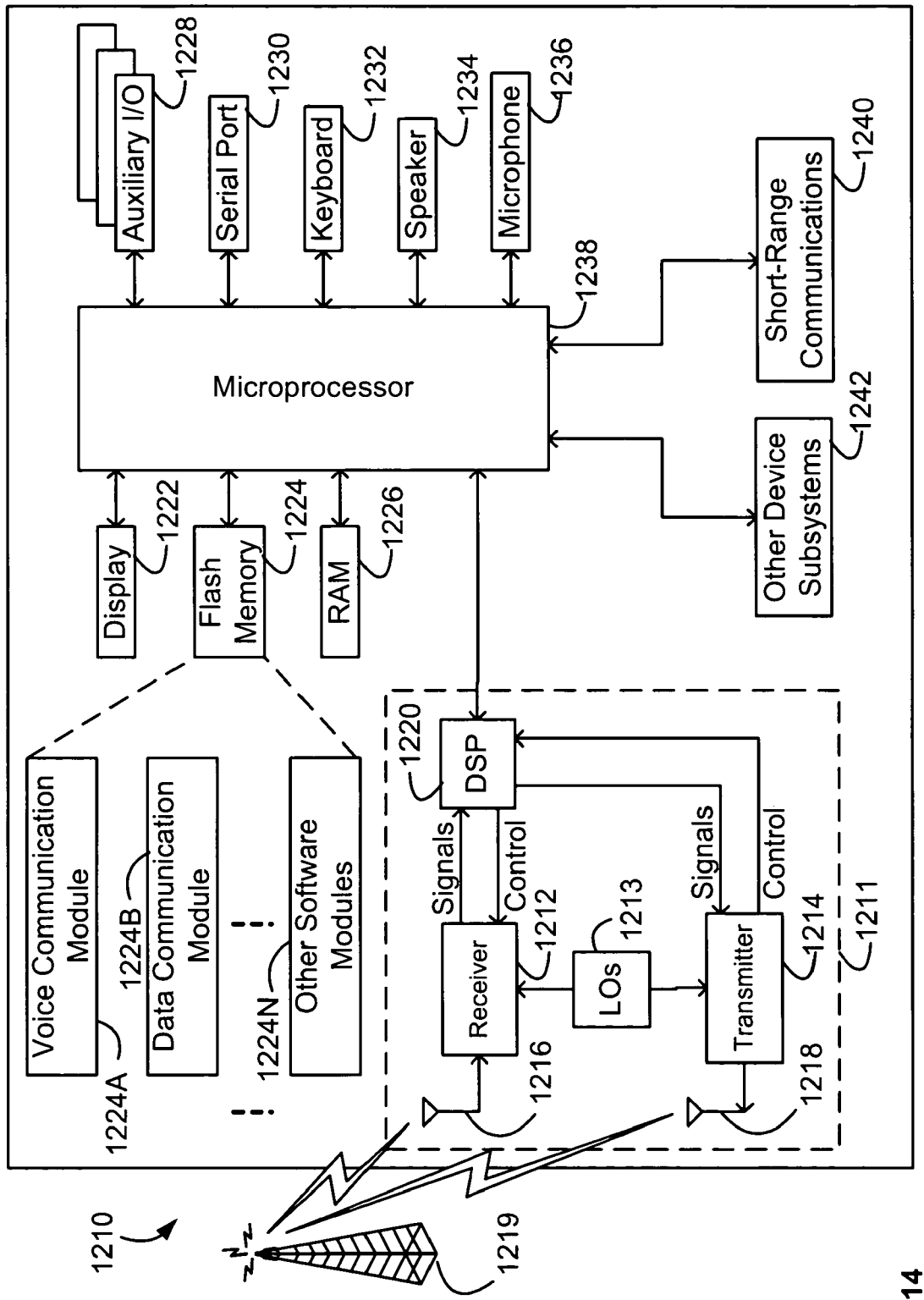
FIG. 14 is a block diagram of a dual-mode mobile communication device.

FIG. 14 is a block diagram of a dual-mode mobile communication device. The media devices 405, for example, include the dual-mode mobile communication device 1210.

The dual-mode device 1210 includes a transceiver 1211, a microprocessor 1238, a display 1222, Flash memory 1224, RAM memory 1226, auxiliary input/output (I/O) devices 1228, a serial port 1230, a keyboard 1232, a speaker 1234, a microphone 1236, a short-range wireless communications sub-system 1240, and may also include other device sub-systems 1242. The transceiver 1211 preferably includes transmit and receive antennas 1216, 1218, a receiver 1212, a transmitter 1214, one or more local oscillators 1213, and a digital signal processor 1220. Within the Flash memory 1224, the device 1210 preferably includes a plurality of software modules 1224A–1224N that can be executed by the microprocessor 1238 (and/or the DSP 1220), including a voice communication module 1224A, a data communication module 1224B, and a plurality of other operational modules 1224N for carrying out a plurality of other functions.

The mobile communication device 1210 is preferably a two-way communication device having voice and data communication capabilities. Thus, for example, the device may communicate over a voice network, such as any of the analog or digital cellular networks, and may also communicate over a data network. The voice and data networks are depicted in FIG. 14 by the communication tower 1219. These voice and data networks may be separate communication networks using separate infrastructure, such as base stations, network controllers, etc., or they may be integrated into a single wireless network.

The communication subsystem 1211 is used to communicate with the voice and data network 1219, and includes the receiver 1212, the transmitter 1214, the one or more local oscillators 1213 and may also include the DSP 1220. The DSP 1220 is used to send and receive signals to and from the transmitter 1214 and receiver 1212, and is also utilized to receive control information from the transmitter 1214 and to provide control information to the receiver 1212. If the voice and data communications occur at a single frequency, or closely-spaced set of frequencies, then a single local oscillator 1213 may be used in conjunction with the transmitter 1214 and receiver 1212. Alternatively, if different frequencies are utilized for voice communications versus data communications, then a plurality of local oscillators 1213 can be used to generate a plurality of frequencies corresponding to the voice and data networks 1219. Although two antennas 1216, 1218 are depicted in FIG. 14, the mobile device 1210 could be used with a single antenna structure. Information, which includes both voice and data information, is communicated to and from the communication module 1211 via a link between the DSP 1220 and the microprocessor 1238. The detailed design of the communication subsystem 1211, such as frequency band, component selection, power level, etc., will be dependent upon the communication network 1219 in which the device is intended to operate. For example, a device 1210 intended to operate in a North American market may include a communication subsystem 1211 designed to operate with the Mobitex™ or DataTAC™ mobile data communication networks and also designed to operated with any of a variety of voice communication networks, such as AMPS, TDMA, CDMA, PCS, etc., whereas a device 1210 intended for use in Europe may be configured to operate with the General Packet Radio Service (GPRS) data communication network and the GSM voice communication network. Other types of data and voice networks, both separate and integrated, may also be utilized with the mobile device 1210.

Depending upon the type of network 1219 (or networks), the access requirements for the dual-mode mobile device 1210 may also vary. For example, in the Mobitex™ and DataTAC™ data networks, mobile devices are registered on the network using a unique identification number associated with each device. In GPRS data networks, however, network access is associated with a subscriber or user of a device 1210. A GPRS device typically requires a subscriber identity module ("SIM"), which is required in order to operate the device 1210 on a GPRS network. Local or non-network communication functions (if any) may be operable, without the SIM device, but the device 1210 will be unable to carry out any functions involving communications over the data network 1219, other than any legally required operations, such as 911 emergency calling.

After any required network registration or activation procedures have been completed, the dual-mode device 1210 may the send and receive communication signals, including both voice and data signals, over the network 1219 (or networks). Signals received by the antenna 1216 from the communication network 1219 are routed to the receiver 1212, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1220. In a similar manner, signals to be transmitted to the network 1219 are processed, including modulation and encoding, for example, by the DSP 1220 and are then provided to the transmitter 1214 for digital to analog conversion, frequency up conversion, filtering, amplification and transmission to the communication network 1219 (or networks) via the antenna 1218. Although a single transceiver 1211 is shown in FIG. 14 for both voice and data communications, it is possible that the device 1210 may include two distinct transceivers, a first transceiver for transmitting and receiving voice signals, and a second transceiver for transmitting and receiving data signals.

In addition to processing the communication signals, the DSP 1220 also provides for receiver and transmitter control. For example, the gain levels applied to communication signals in the receiver 1212 and transmitter 1214 may be adaptively controlled through automatic gain control algorithms implemented in the DSP 1220. Other transceiver control algorithms could also be implemented in the DSP 1220 in order to provide more sophisticated control of the transceiver 1211.

The microprocessor 1238 preferably manages and controls the overall operation of the dual-mode mobile device 1210. Many types of microprocessors or microcontrollers could be used here, or, alternatively, a single DSP 1220 could be used to carry out the functions of the microprocessor 1238. Low-level communication functions, including at least data and voice communications, are performed through the DSP 1220 in the transceiver 1211. Other, high-level communication applications, such as a voice communication application 1224A, and a data communication application 1224B may be stored in the Flash memory 1224 for execution by the microprocessor 1238. For example, the voice communication module 1224A may provide a high-level user interface operable to transmit and receive voice calls between the dual-mode mobile device 1210 and a plurality of other voice devices via the network 1219. Similarly, the data communication module 1224B may provide a high-level user interface operable for sending and receiving data, such as e-mail messages, files, organizer information, short text messages, etc., between the dual-mode mobile device 1210 and a plurality of other data devices via the network 1219. The microprocessor 1238 also interacts with other device subsystems, such as the display 1222, Flash memory 1224, random access memory (RAM) 1226, auxiliary input/output (I/O) subsystems 1228, serial port 1230, keyboard 1232, speaker 1234, microphone 1236, a short-range communications subsystem 1240 and any other device subsystems generally designated as 1242.

Some of the subsystems shown in FIG. 14 perform communication-related functions, whereas other subsystems may provide resident or on-device functions. Notably, some subsystems, such as keyboard 1232 and display 1222 may be used for both communication-related functions, such as entering a text message for transmission over a data communication network, and device-resident functions such as a calculator or task list or other PDA type functions.

Operating system software used by the microprocessor 1238 is preferably stored in a persistent store such as Flash memory 1224. In addition to the operating system, which controls all of the low-level functions of the device 1210, the Flash memory 1224 may include a plurality of high-level software application programs, or modules, such as a voice communication module 1224A, a data communication module 1224B, an organizer module (not shown), or any other type of software module 1224N. Where of the media devices 105 includes the dual-mode mobile communication device 1210, another software module 1224N implements the media engine 530, as described above. The Flash memory 1224 also may include a file system for storing data. These modules are executed by the microprocessor 1238 and provide a high-level interface between a user of the device and the device. This interface typically includes a graphical component provided through the display 1222, and an input/output component provided through the auxiliary I/O 1228, keyboard 1232, speaker 1234, and microphone 1236. The operating system, specific device applications or modules, or parts thereof, may be temporarily loaded into a volatile store, such as RAM 1226 for faster operation. Moreover, received communication signals may also be temporarily stored to RAM 1226, before permanently writing them to a file system located in the flash memory 1224.

An exemplary application module 1224N that may be loaded onto the dual-mode device 1210 is a personal information manager (PIM) application providing PDA functionality, such as calendar events, appointments, and task items. This module 1224N may also interact with the voice communication module 1224A for managing phone calls, voice mails, etc., and may also interact with the data communication module for managing e-mail communications and other data transmissions. Alternatively, all of the functionality of the voice communication module 1224A and the data communication module 1224B may be integrated into the PIM module.

The Flash memory 1224 preferably provides a file system to facilitate storage of PIM data items on the device. The PIM application preferably includes the ability to send and receive data items, either by itself, or in conjunction with the voice and data communication modules 1224A, 1224B, via the wireless network 1219. The PIM data items are preferably seamlessly integrated, synchronized and updated, via the wireless network 1219, with a corresponding set of data items stored or associated with a host computer system, thereby creating a mirrored system for data items associated with a particular user.

The mobile device 1210 may also be manually synchronized with a host system by placing the device 1210 in an interface cradle, which couples the serial port 1230 of the mobile device 1210 to the serial port of the host system. The serial port 1230 may also be used to enable a user to set preferences through an external device or software application, or to download other application modules 1224N for installation. This wired download path may be used to load an encryption key onto the device, which is a more secure method than exchanging encryption information via the wireless network 1219.

Additional application modules 1224N may be loaded onto the dual-mode device 1210 through the network 1219, through an auxiliary I/O subsystem 1228, through the serial port 1230, through the short-range communications subsystem 1240, or through any other suitable subsystem 1242, and installed by a user in the Flash memory 1224 or RAM 1226. Such flexibility in application installation increases the functionality of the device 1210 and may provide enhanced on-device functions, communication-related functions, or both. For example, secure communication applications may enable electronic commerce functions and other such financial transactions to be performed using the device 1210.

When the dual-mode device 1210 is operating in a data communication mode, a received signal, such as a text message or a web page download, will be processed by the transceiver 1211 and provided to the microprocessor 1238, which will preferably further process the received signal for output to the display 1222, or, alternatively, to an auxiliary I/O device 1228. A user of dual-mode device 1210 may also compose data items, such as email messages, using the keyboard 1232, which is preferably a complete alphanumeric keyboard laid out in the QWERTY style, although other styles of complete alphanumeric keyboards such as the known DVORAK style may also be used. User input to the device 1210 is further enhanced with a plurality of auxiliary I/O devices 1228, which may include a thumbwheel input device, a touchpad, a variety of switches, a rocker input switch, etc. The composed data items input by the user may then be transmitted over the communication network 1219 via the transceiver 1211.

When the dual-mode device 1210 is operating in a voice communication mode, the overall operation of the device 1210 is substantially similar to the data mode, except that received signals are preferably be output to the speaker 1234 and voice signals for transmission are generated by a microphone 1236. Alternative voice or audio I/O subsystems, such as a voice message recording subsystem, may also be implemented on the device 1210. Although voice or audio signal output is preferably accomplished primarily through the speaker 1234, the display 1222 may also be used to provide an indication of the identity of a calling party, the duration of a voice call, or other voice call related information. For example, the microprocessor 1238, in conjunction with the voice communication module and the operating system software, may detect the caller identification information of an incoming voice call and display it on the display 1222.

A short-range communications subsystem 1240 may also be included in the dual-mode device 1210. For example, the subsystem 1240 may include an infrared device and associated circuits and components, or a Bluetooth™ short-range wireless communication module to provide for communication with similarly-enabled systems and devices.

It will be appreciated that the above description relates to embodiments by way of example only. Many variations on the invention will be obvious to those knowledgeable in the field, and such obvious variations are within the scope of the invention as described, whether or not expressly described.

For example, although the systems and methods according to aspects of the invention as described herein are particularly suited to media devices, the content size and processing requirement reductions may also be advantageous in other systems such as desktop computer systems and the like in which memory and processing resources are not as limited as in media devices. Smaller file sizes and less intensive processing results in faster content transfer and display.

It should also be appreciated that content converters and processors are not dependent upon any particular communication networks, systems or protocols. As such, content converters and processors in accordance with the present invention may be implemented in virtually any one-way or two-way communication device. Communication-related dependencies are addressed in the communication subsystems in content provider systems and devices.

Although only two media devices and one wireless network, gateway, WAN and content provider system have been shown in the drawings, it will be obvious that a communication system will normally include many such components. A content provider system may be configured to communicate with multiple gateways and different wireless networks, possibly through different types of connections to different gateways. Each wireless network normally includes multiple gateways and provides communication services to thousands or even millions of devices, any or all of which may be enabled for communications with one or more content provider systems.

Furthermore, while the external converter and the converter are described in the context of the content provider system described above, the external converter and the converter may be used in any system which requires conversion of rich content. In addition, while the external converter and the converter are described as distinct entities, the external converter and converter may be combined into one entity which has the functionality of both. Additionally, while the animations are described as being contained in computer-readable files, they may also be contained in other computer-readable memory and data structures. Also, the system and method described can convert frame-based animations which are formatted differently from the example provided, and can convert to interpolator-based animations which are formatted differently from the example provided. For example, the normalization of key-times, and the manner in which depths are specified may differ.

What is claimed is:

1. A method for converting a frame-based animation into an interpolator-based animation, the frame based animation including a plurality of animation objects and a plurality of successive frames represented by frame instructions, the frames including a displayed group of the animation objects, the animation objects in the displayed group having associated display properties that change throughout the successive frames, the animation objects in the displayed group each appearing at a unique associated depth in the frames, the frame instructions identifying for each frame the animation objects from the displayed group appearing therein and the display properties and depth associated with each of the animation objects appearing therein, the method including steps of:
- a) identifying each unique combination of animation object and associated depth identified in the frame instructions for the plurality of frames;
- b) for each identified unique combination, identifying the display properties associated with the animation object of the combination through the successive frames; and
- c) for each identified display property for each identified unique combination, creating an interpolator associated with the animation object of the combination which specifies any changes that occur in the display property for the specified animation object throughout the plurality of frames.

2. The method of claim 1 wherein each unique combination of animation object and associated depth is identified by a unique key based on an identifier for the animation object and a value assigned to the associated depth.

3. The method of claim 1 wherein each animation object in the plurality of animation objects has a unique type identifier associated therewith, each of the depths having a unique depth value, wherein each unique combination of animation object and associated depth is identified by a unique key based on the depth value associated with the depth of the unique combination and on the type identifier associated with the animation object of the combination.

4. The method of claim 3 wherein the key is a numerical value having first and second parts wherein a value for the first part is set based on the depth value associated with the depth of the unique combination and a value for the second part is set based on the type identifier associated with the animation object of the combination, the first part being a more significant part of the numerical value than the second part.

5. The method of claim 1 wherein the frames of the animation object have an associated frame rate, wherein step (b) includes determining a relative time identifier for each change in each identified display property based on the frame rate and the number of frames, and step (c) includes specifying in each interpolator the relative time identifiers for each of the changes in the display property specified therein.

6. The method of claim 1 wherein the frames have an associated frame rate specified in the frame instructions and steps (a), (b) and (c) collectively include steps of:
- (1) creating a key list, and for each animation object appearing in each frame identified in the frame instructions performing steps of:
  - (i) generating a key that specifies an identifier associated with the animation object and a depth value associated with the depth at which the animation object appears;
  - (ii) determining if the key is present in the key list and (A) if the key is not present in the key list, adding the key to the key list, creating a table that is associated with the key, and recording in the associated table the display properties associated with the animation object for the frame; and (B) if the key is present in the key list, determining if any of the display properties associated with the animation object have changed since being last recorded in the associated table, and if so, recording a key-time based on a relative location of the frame in the plurality of frames and the frame rate and updating the associated table to record, in association with the key-time, any changes in the respective display properties associated with the animation object that have changed since the respective display properties associated with the animation object were last recorded;
- (2) processing each table, including for each table creating an interpolator for each display property for which a change therein has been recorded in the table, the interpolator specifying (i) an identifier identifying the animation object associated with the key associated with the table; (ii) any changes in the display property occurring throughout the plurality of frames; and (iii) for each of the specified changes, a key-time assigning a relative time value to the change; and
- (3) outputting as an interpolator based animation the plurality of animation objects and the interpolators.

7. The method of claim 6 wherein prior to step (2), the key list is sorted into a descending order based on the depth values; in step (2) the tables are processed in an order based on of the keys in the key list; and in step (3) the interpolators are output in an order corresponding to an order in which the interpolators were created in step (2).

8. The method of claim 1 wherein the plurality of animation objects includes shapes, images, buttons and text.

9. The method of claim 1 wherein the display properties associated with the animation objects in the displayed group include position, visibility, color, scale, rotation and skew.

10. The method of claim 1 wherein at least some of the frames include sprites, each sprite including a plurality of successive sub-frames, the sub-frames including a sprite displayed group of the animation objects, the animation objects in the sprite displayed group having associated display properties that change throughout the successive sub-frames, the animation objects in the sprite displayed group each appearing at a unique associated depth in the sub-frames, the frame instructions identifying for each frame any sprites appearing therein, and for each sprite the animation objects from the sprite displayed group appearing therein and the display properties and depth associated with each of the animation objects appearing in the sprite, the method including steps of:
- a) for each sprite, identifying each unique sprite combination of animation object and associated depth identified in the frame instructions for the plurality of sub-frames of the sprite;
- b) for each identified unique sprite combination, identifying the display properties associated with the animation object of the combination through the successive sub-frames; and
- c) for each identified display property for each identified unique sprite combination, creating an interpolator that specifies the animation object of the combination and any changes that occur in the display property for the specified animation object throughout the plurality of sub-frames.

11. A converter for converting a frame-based animation into an interpolator based animation, the frame-based animation including a plurality of animation objects each having an associated type identifier and a plurality of successive frames represented by frame instructions, the frames including a displayed group of the animation objects, the animation objects in the displayed group having associated display properties that change throughout the successive frames, the animation objects in the displayed group each appearing at a unique associated depth in the frames, the frame instructions specifying for each frame the animation objects appearing therein, and display properties and associated depth of the animation objects appearing therein, the interpolator based animation including the plurality of animation objects and a plurality of interpolators, each interpolator being associated with a target display property of a target animation object type selected from the plurality of animation objects and specifying changes that occur in the target display property during a display duration, the converter including:

an input module for receiving a frame based animation and extracting the frame instructions therefrom;

a converter module for (a) receiving the extracted frame instructions from the input module and based thereon identifying each unique combination of animation object and associated depth appearing in the plurality of frames, and (b) for each identified unique combination, identifying the display properties associated with the animation object of the combination through the plurality of frames; and an output module responsive to the converter module for creating for each identified display property for each identified unique combination an interpolator specifying (i) the identified display property as a target display property, (ii) the animation object of the combination as a target animation object, and (iii) any changes that occur in the display property for the specified animation object throughout the plurality of frames.

12. The converter of claim 11 wherein the converter module includes means for generating, for each identified unique combination, a unique identifying key based on a depth value associated with the depth of the unique combination and on the type identifier associated with the animation object of the combination.

13. The converter of claim 12 wherein the key is a numerical value having first and second parts wherein a value for the first part is set based on the depth value associated with the depth of the unique combination and a value for the second part is set based on the type identifier associated with the animation object of the combination, the first part being a more significant part of the numerical value than the second part.

14. The converter of claim 13 wherein one of the converter module and output module is configured for sorting the identifying keys based on the first part, and the output module is configured for outputting the interpolators in an order that corresponds to the sorted identifying keys of the unique combinations that the interpolators have been created for.

15. The converter of claim 11 wherein the plurality of successive frames have an associated frame rate, wherein the converter module is also for determining a relative time identifier for each change in each identified display property based on the frame rate and the relative location of the frame in which the change occurs in the plurality of frames, and specifying in each interpolator the relative time identifiers for each of the changes in the display property specified therein.

16. The converter of claim 15 wherein the time identifiers are normalized such that each of the time identifiers has a value between zero to one.

17. The converter of claim 11 wherein the plurality of animation objects includes shapes, images, buttons and text.

18. The converter of claim 11 wherein the display properties associated with the animation objects in the displayed group include position, visibility, color, scale, rotation and skew.

19. The converter of claim 11 wherein the interpolator-based animation is outputted in an XML compliant format with the interpolators represented as animate tags.

20. The converter of claim 19 wherein at least some of the animation objects in the interpolator-based animation are represented as path elements in the XML compliant format.

* * * * *